United States Patent
Dudar et al.

(10) Patent No.: US 10,330,051 B2
(45) Date of Patent: Jun. 25, 2019

(54) SYSTEMS AND METHODS FOR INTELLIGENT VEHICLE EVAPORATIVE EMISSIONS DIAGNOSTICS

(71) Applicant: Ford Global Technologies, LLC, Dearborn, MI (US)

(72) Inventors: Aed M. Dudar, Canton, MI (US); Douglas Raymond Martin, Canton, MI (US); Robert Roy Jentz, Westland, MI (US); Kevin Lucka, Southfield, MI (US); Mohammad R. Aghili, Dearborn, MI (US); Donald P. Tinsley, III, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 368 days.

(21) Appl. No.: 15/389,195

(22) Filed: Dec. 22, 2016

(65) Prior Publication Data

US 2018/0179993 A1   Jun. 28, 2018

(51) Int. Cl.
   *F02M 25/08*   (2006.01)
   *B60K 15/035*  (2006.01)
   (Continued)

(52) U.S. Cl.
   CPC ... *F02M 25/0818* (2013.01); *B60K 15/03504* (2013.01); *B60K 15/03519* (2013.01);
   (Continued)

(58) Field of Classification Search
   CPC .............. F02M 25/08; F02M 25/0818; F02M 25/0836; F02D 41/0032; F02D 41/004;
   (Continued)

(56) References Cited

U.S. PATENT DOCUMENTS

| 5,333,590 | A  | 8/1994  | Thomson |
| 6,016,690 | A  | 1/2000  | Cook et al. |
| 6,164,123 | A  | 12/2000 | Corkill |
| 6,396,395 | B1 | 5/2002  | Zielinski et al. |
| 8,401,733 | B2 | 3/2013  | Weslati et al. |
| 8,739,766 | B2 | 6/2014  | Jentz et al. |

(Continued)

FOREIGN PATENT DOCUMENTS

| CN | 104251703 A   | 12/2014 |
| WO | 2014051755 A1 | 4/2014  |

OTHER PUBLICATIONS

Dudar, Aed M., "Systems and Methods for Opportunistic Vehicle Evaporative Emissions Test Diagnostic," U.S. Appl. No. 15/092,336, filed Apr. 6, 2016, 61 pages.

*Primary Examiner* — Hieu T Vo
(74) *Attorney, Agent, or Firm* — Julia Voutyras; McCoy Russell LLP

(57) ABSTRACT

Methods and systems are provided for conducting tests for undesired evaporative emissions on a vehicle fuel system and evaporative emissions system. In one example, a method may include learning routes commonly traveled by the vehicle, including altitude changes and stop durations, and may further include diagnosing the fuel system and evaporative emissions system based on the learned altitude changes in one example, and may include diagnosing the fuel system and evaporative emissions system based on a learned stop duration in another example. By conducting tests for undesired evaporative emissions as a function of learned travel routes, completion rates for tests for undesired evaporative emissions tests may be increased, and the release of undesired evaporative emissions to atmosphere may be reduced.

20 Claims, 14 Drawing Sheets

(51) Int. Cl.
*F02D 41/00* (2006.01)
*B60K 15/03* (2006.01)

(52) U.S. Cl.
CPC ....... *F02D 41/004* (2013.01); *F02D 41/0032* (2013.01); *F02M 25/0836* (2013.01); *B60K 2015/0319* (2013.01); *B60K 2015/0321* (2013.01); *B60K 2015/03217* (2013.01); *B60K 2015/03514* (2013.01); *F02D 2200/0602* (2013.01); *F02D 2200/701* (2013.01)

(58) Field of Classification Search
CPC ....... F02D 2200/0602; F02D 2200/701; B60K 15/03504; B60K 15/03519; B60K 2015/0319; B60K 2015/0321; B60K 2015/03217; B60K 2015/03514
See application file for complete search history.

(56) References Cited

U.S. PATENT DOCUMENTS

| | | | |
|---|---|---|---|
| 8,849,503 | B1 | 9/2014 | Dudar |
| 9,291,128 | B2 | 3/2016 | Dudar |
| 10,138,827 | B2 * | 11/2018 | Dudar .................. F02D 41/004 |
| 10,150,365 | B2 * | 12/2018 | Dudar .............. B60K 15/03504 |
| 2013/0218379 | A1 | 8/2013 | Filev et al. |
| 2014/0069394 | A1 | 3/2014 | Jentz et al. |
| 2014/0114550 | A1 | 4/2014 | Bohr et al. |
| 2014/0130781 | A1 | 5/2014 | Jentz et al. |
| 2014/0172292 | A1 | 6/2014 | McGee et al. |
| 2014/0300494 | A1 | 10/2014 | Tseng et al. |
| 2015/0032357 | A1 | 1/2015 | Dudar |
| 2016/0025589 | A1 | 1/2016 | Tseng et al. |
| 2016/0245200 | A1 | 8/2016 | Bohr et al. |

* cited by examiner

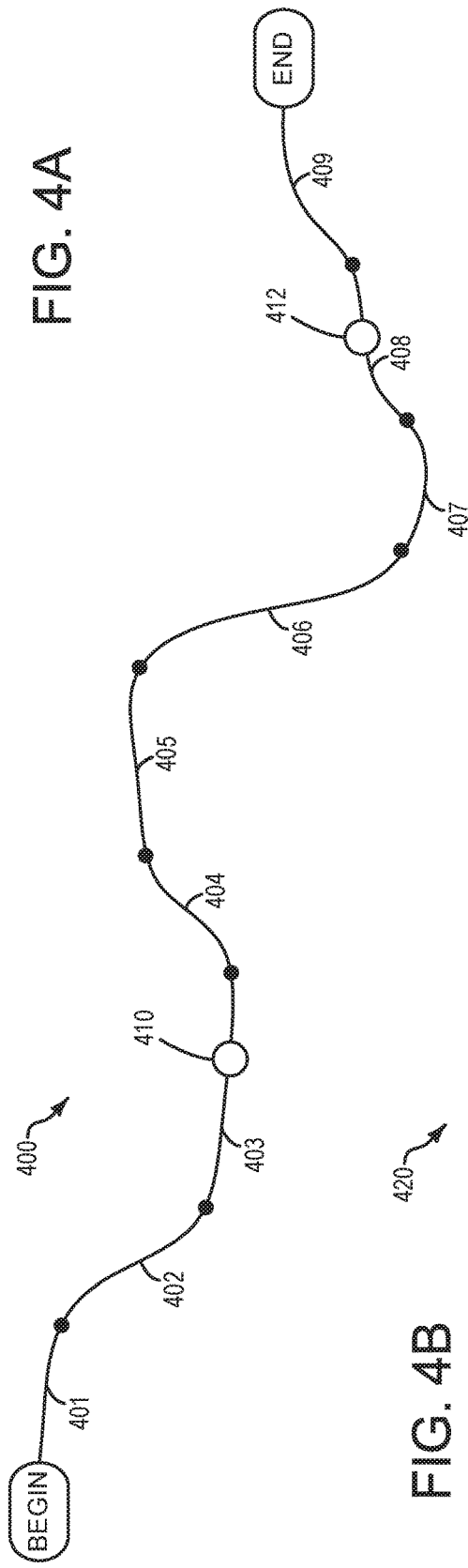

FIG. 4A

| Segment | ΔP yield | Stops? | Stop duration | Evap test possible? | Evap test type |
|---|---|---|---|---|---|
| Segment 401 | < -2 InH2O | No | N/A | No | N/A |
| Segment 402 | -9 InH2O | No | N/A | Yes | Barometric pressure change test |
| Segment 403 | -3 InH2O | Yes (410) | < 45 min | Yes | Active vacuum draw |
| Segment 404 | 7 InH2O | No | N/A | No | N/A |
| Segment 405 | < 2 InH2O | No | N/A | No | N/A |
| Segment 406 | -11 InH2O | No | N/A | Yes | Barometric pressure change test |
| Segment 407 | < -2 InH2O | No | N/A | No | N/A |
| Segment 408 | 5 InH2O | Yes (412) | > 45 min | No | EONV or active vac draw |
| Segment 409 | 6 InH2O | No | N/A | No | N/A |
| End destination | N/A | Yes (End) | > 45 min | Yes | EONV or active vac draw |

FIG. 4B

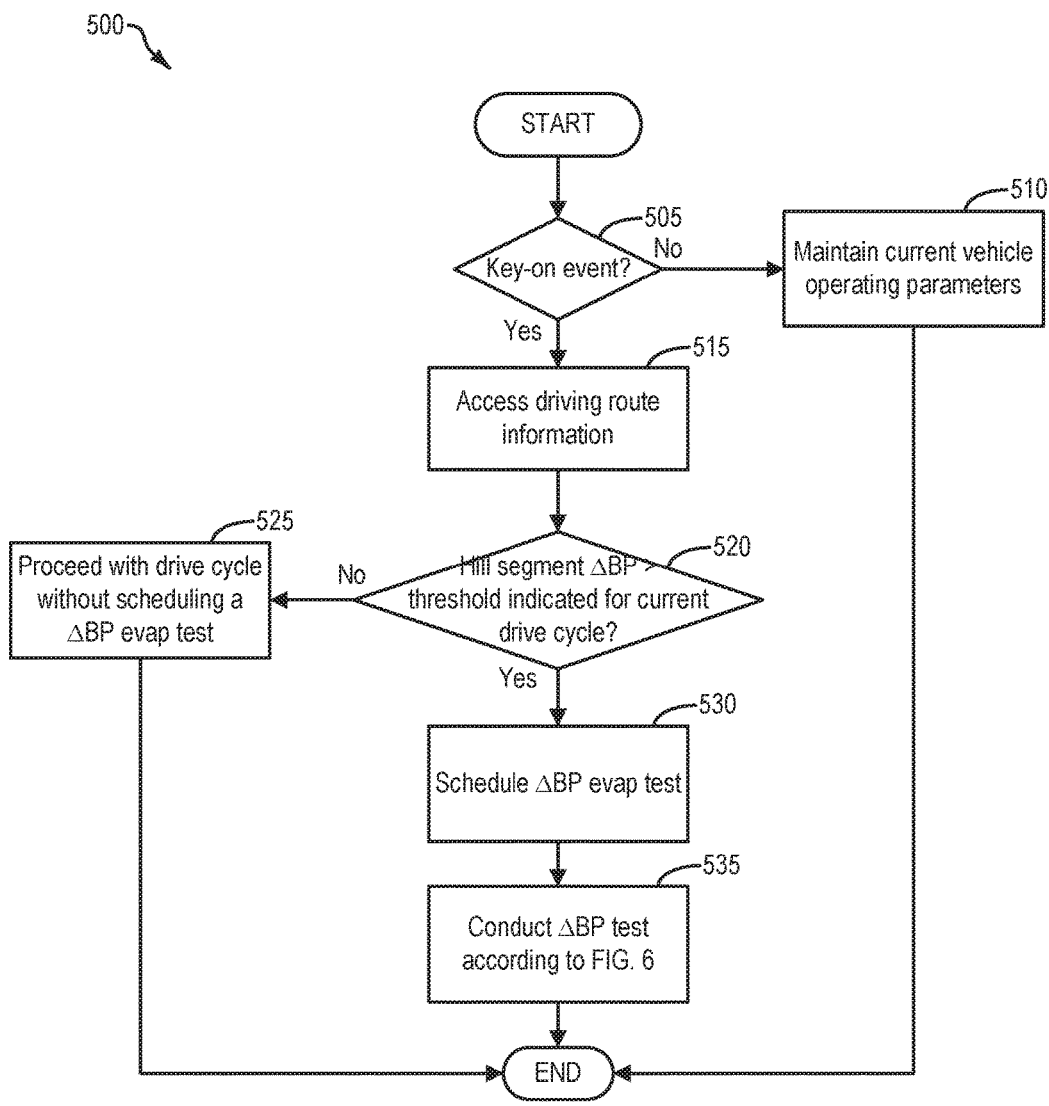

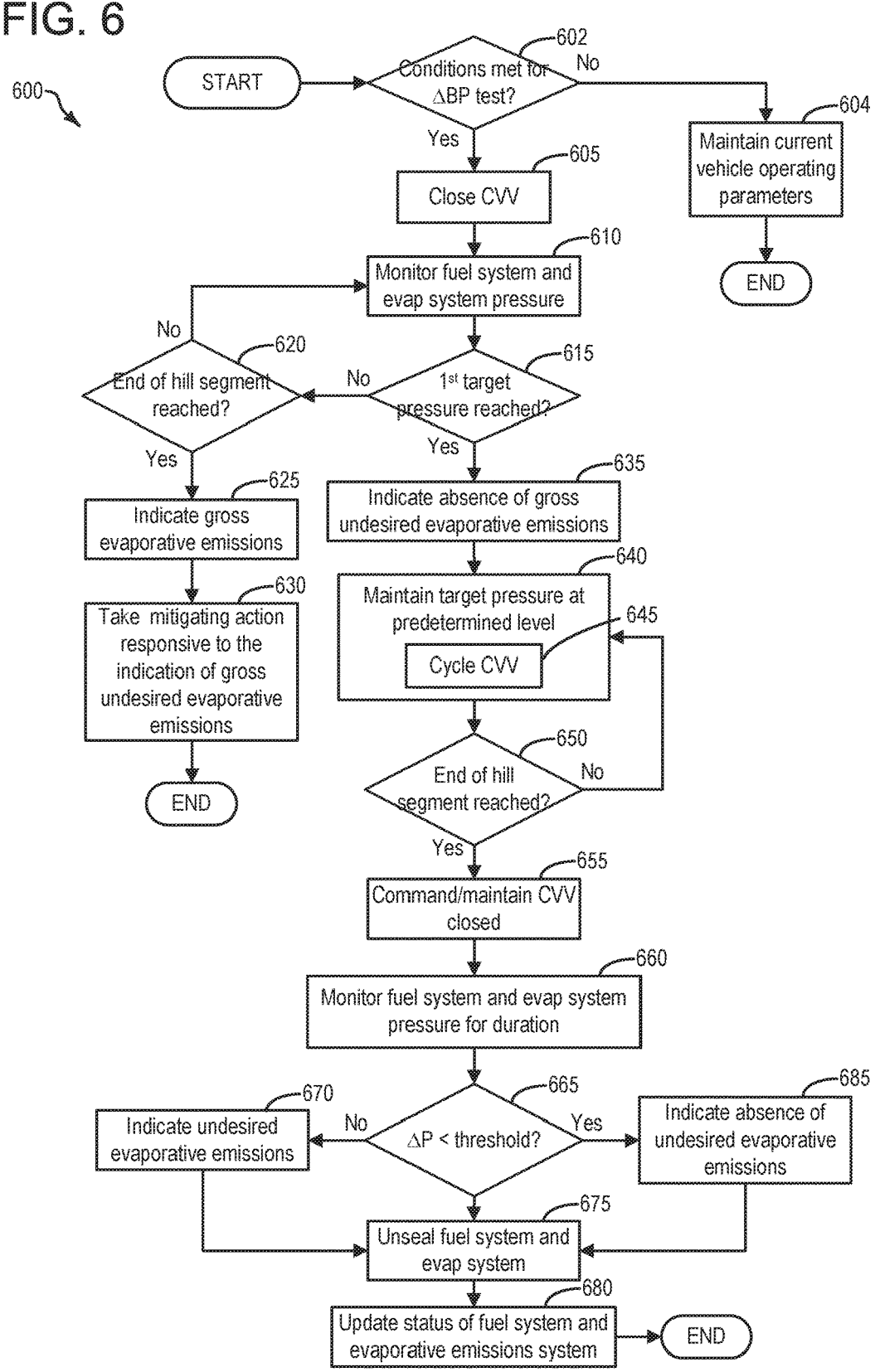

SYSTEMS AND METHODS FOR INTELLIGENT VEHICLE EVAPORATIVE EMISSIONS DIAGNOSTICS

FIELD

The present description relates generally to methods and systems for controlling a vehicle engine to execute vehicle evaporative emissions diagnostic routines based on learned travel routines.

BACKGROUND/SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of undesired vapor emissions that could release fuel vapors to the atmosphere. Undesired vapor emissions may be identified using engine-off natural vacuum (EONV) during conditions when a vehicle engine is not operating. In particular, a fuel system may be isolated at an engine-off event. The pressure in such a fuel system may increase if the tank is heated further (e.g., from hot exhaust or a hot parking surface) as liquid fuel vaporizes. A pressure rise above a threshold may indicate the absence of undesired fuel system vapor emissions. Alternatively, in the absence of a pressure rise above a threshold, as a fuel system cools down, a vacuum is generated therein as fuel vapors condense to liquid fuel. Vacuum generation may monitored and undesired fuel system vapor emissions identified based on expected vacuum development or expected rates of vacuum development.

Entry conditions and thresholds for an EONV test may be based on an inferred total amount of heat rejected into the fuel tank during the prior drive cycle. The inferred amount of heat may be based on engine run-time, integrated mass air flow, fuel level, ambient temperature, reid vapor pressure, etc. While these heat rejection inferences work well in most conditions, they may be prone to errors when noise factors are involved. For example, if a vehicle is driven downhill for an extended period, driven under rainy and/or windy conditions, or under conditions where a period of high-speed driving is followed by a period of idling, much of the heat rejection to the fuel tank may be negated. As a result, in an example where an EONV test is executed based on a heat rejection inference where the above-described noise factors are involved may result in a false failure. Furthermore, relying solely on heat rejection for conducting EONV diagnostics may be problematic for hybrid vehicles, where engine run-time may be limited, thus limiting an amount of heat rejected from the engine for particular drive cycles.

Still further, a typical EONV test may be enabled to run for a predetermined time duration (e.g. 45 minutes), where the time limit may be a function of battery power. Accordingly, if a vehicle initiates an EONV test at a vehicle-off event, but the vehicle does not remain in a vehicle-off state for more than the predetermined EONV time duration, then the EONV test may be aborted. EONV tests that are executed, but not completed, may affect completion rates, and may further result in increased loading of a fuel vapor canister, increased wear and tear on valves that are actuated open or closed to conduct the EONV test, and may further result in some examples in premature fuel pump shutoffs.

Thus, a more intelligent means of determining when and how to execute diagnostic tests for undesired evaporative emissions, is desired.

The inventors have herein recognized these issues, and have developed systems and methods to at least partially address the above issues. In one example, a method is provided, comprising learning routes commonly traveled by an engine-driven vehicle, including altitude changes and stop durations. The method may further include storing fuel vapors from a fuel system supplying fuel to the engine in a vapor storage device positioned in an evaporative emissions system, and diagnosing the fuel system and evaporative emissions system for undesired evaporative emissions based on a learned altitude change in a first condition, and based on a learned stop duration in a second condition.

As one example, the learned altitude change in the first condition includes a change in altitude sufficient to result in a pressure change yield in the fuel system and evaporative emissions system greater than a predetermined pressure change yield threshold, under conditions where the fuel system and evaporative emissions system are sealed from atmosphere during the change in altitude. Responsive to the predetermined pressure change yield threshold being reached during the change in altitude, the method may include sealing or maintaining sealed the fuel system and evaporative emissions system, monitoring pressure in the sealed fuel system and evaporative emissions system, and indicating the fuel system and evaporative emissions system are free from undesired evaporative emissions responsive to pressure in the fuel system and evaporative emissions system not reaching a predetermined pressure threshold for a predetermined duration.

As one example, diagnosing the fuel system and evaporative emissions system based on a learned stop duration in the second condition further comprises responsive to a vehicle-off event corresponding to the learned stop duration comprising a duration less than a predetermined threshold duration, actively reducing pressure in the fuel system and evaporative emissions system to a predetermined target vacuum, and actively maintaining the predetermined target vacuum until a vehicle-off event is indicated. Responsive to the predetermined target vacuum being reached and the vehicle-off event being indicated, the method may include sealing or maintaining sealed the fuel system and evaporative emissions system from engine intake and from atmosphere. Subsequently, the method may include indicating an absence of undesired evaporative emissions in the fuel system and evaporative emissions system responsive to pressure bleed-up in the fuel system and evaporative emissions system not reaching a predetermined pressure bleed-up threshold, or responsive to a pressure bleed-up rate not reaching or exceeding a predetermined pressure bleed-up rate threshold.

In this way, a vehicle fuel system and evaporative emissions system may be diagnosed as to the presence or absence of undesired evaporative emissions, where the tests may be scheduled according to learned travel routines. By scheduling the tests based on learned travel routines, the tests may be initiated at times wherein the tests are likely to be completed without prematurely being aborted, which may increase completion rates and which may reduce undesired evaporative emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4A schematically shows an example learned driving route with predicted/learned stops, hill segments, and final destination.

FIG. 4B schematically shows an example lookup table storing information on the example learned driving route depicted at FIG. 4A.

FIG. 5 shows a high level flowchart for an example method for scheduling a test for undesired evaporative emissions based on predicted/learned altitude changes encountered in a learned driving route.

FIG. 6 shows a high level flowchart for conducting a test for undesired evaporative emissions based on predicted/learned altitude changes encountered in a learned driving route.

DETAILED DESCRIPTION

The following description relates to systems and methods for conducting tests for undesired evaporative emissions on a vehicle fuel system and evaporative emissions system. The tests may be conducted on a vehicle system capable of being propelled via an engine, via an onboard energy storage device such as a battery, or a combination of an engine and onboard energy storage device, such as the vehicle system depicted in FIG. 1. The tests may indicate whether a vehicle fuel system and evaporative emissions system, depicted at FIG. 2, are free from undesired evaporative emissions. The tests for determining whether the fuel system and evaporative emissions system are free from undesired evaporative emissions may be based on learned travel routines commonly traveled by the vehicle, where common travel routines may be learned according to the method depicted at FIG. 3. The learned common travel routines may include information pertaining to altitude changes associated with hill segments, and duration of vehicle stops along learned routes, illustrated at FIG. 4A. Such information may be stored in one or more lookup tables stored at a vehicle controller, as illustrated at FIG. 4B.

Figure 7:
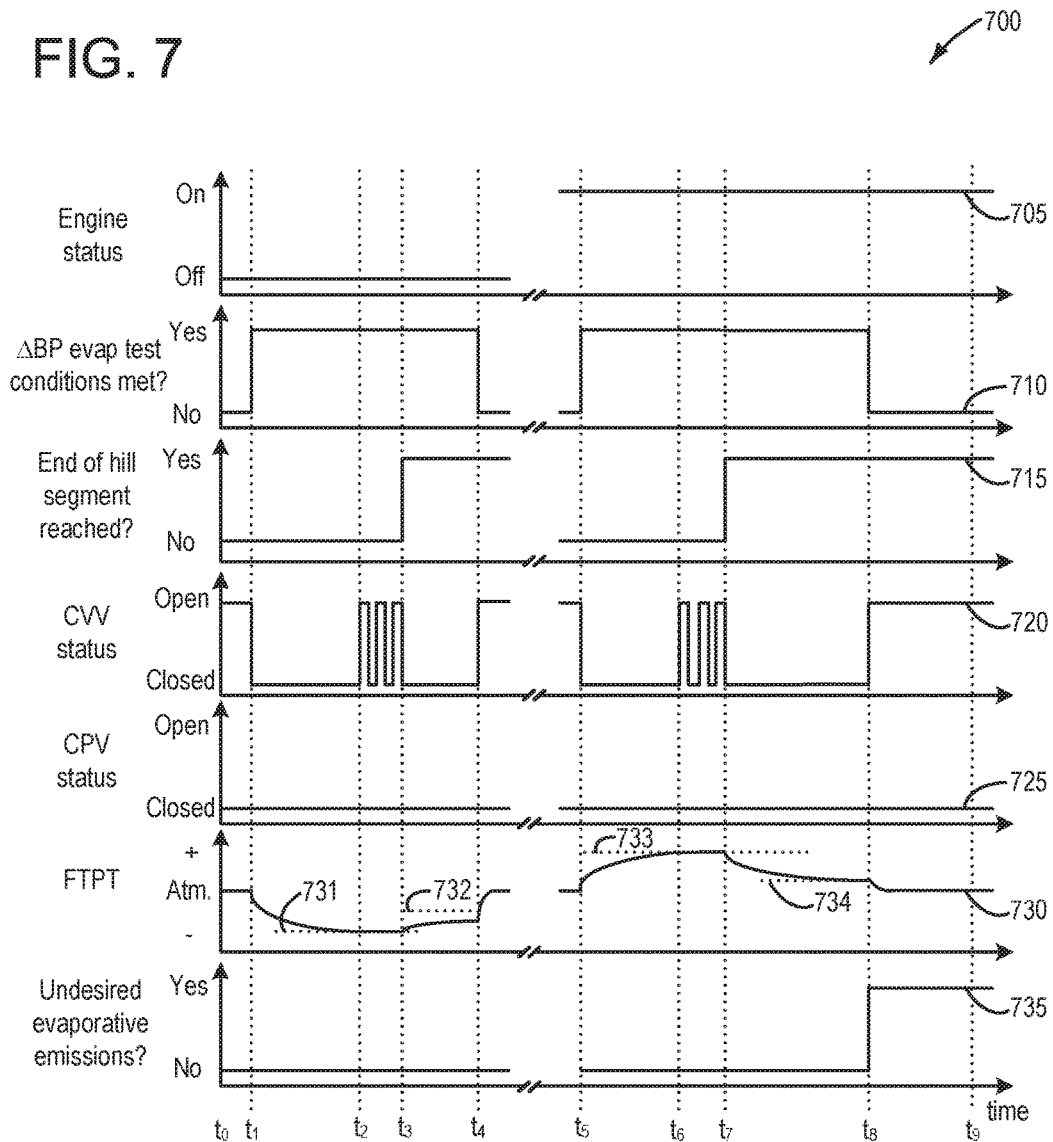
FIG. 7 shows an example timeline for conducting a test for undesired evaporative emissions based on predicted/learned altitude changes according to the methods of FIG. 5 and FIG. 6.
Figure 9:
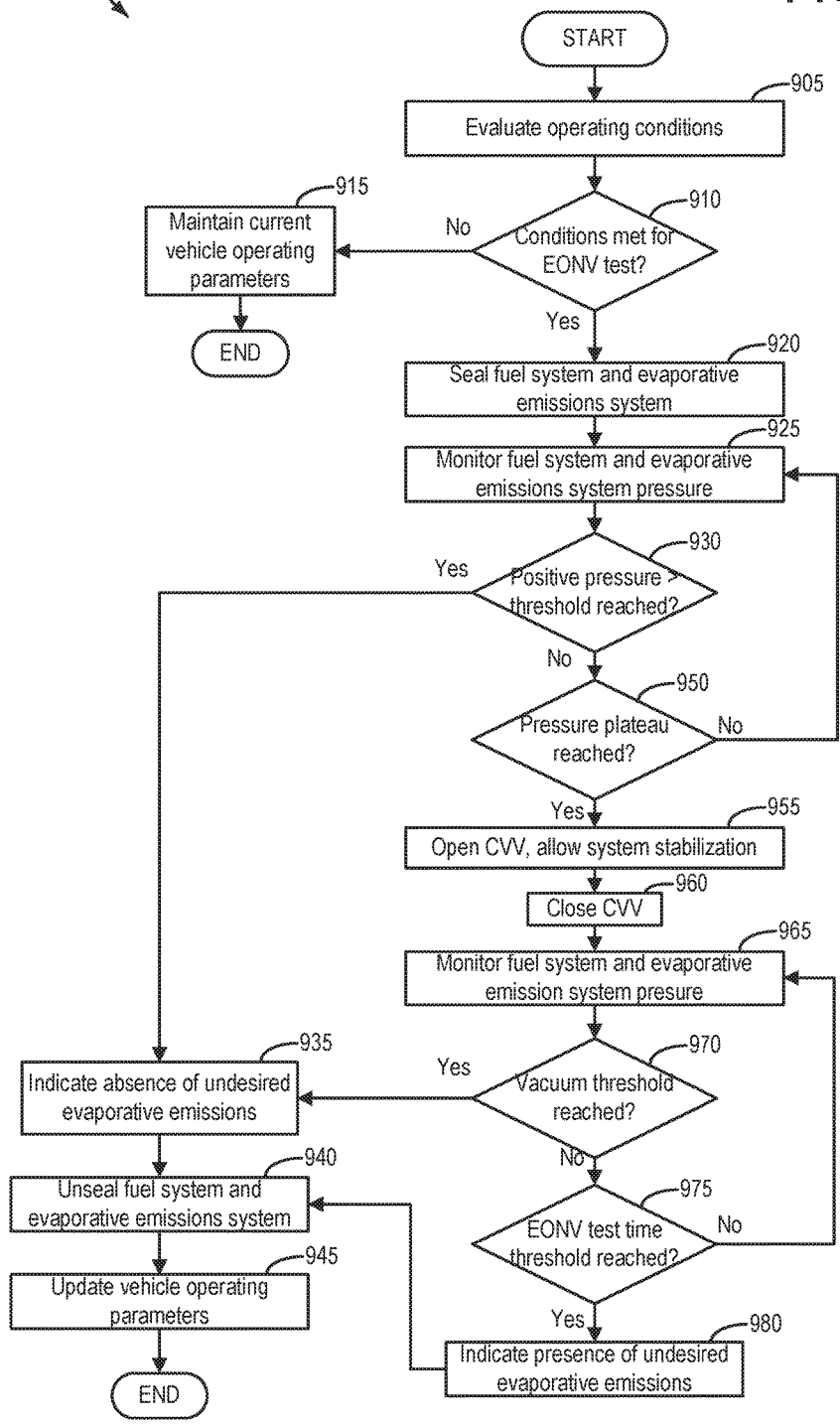
FIG. 9 shows a high level flowchart for an example method for conducting an EONV test.
Figure 10:
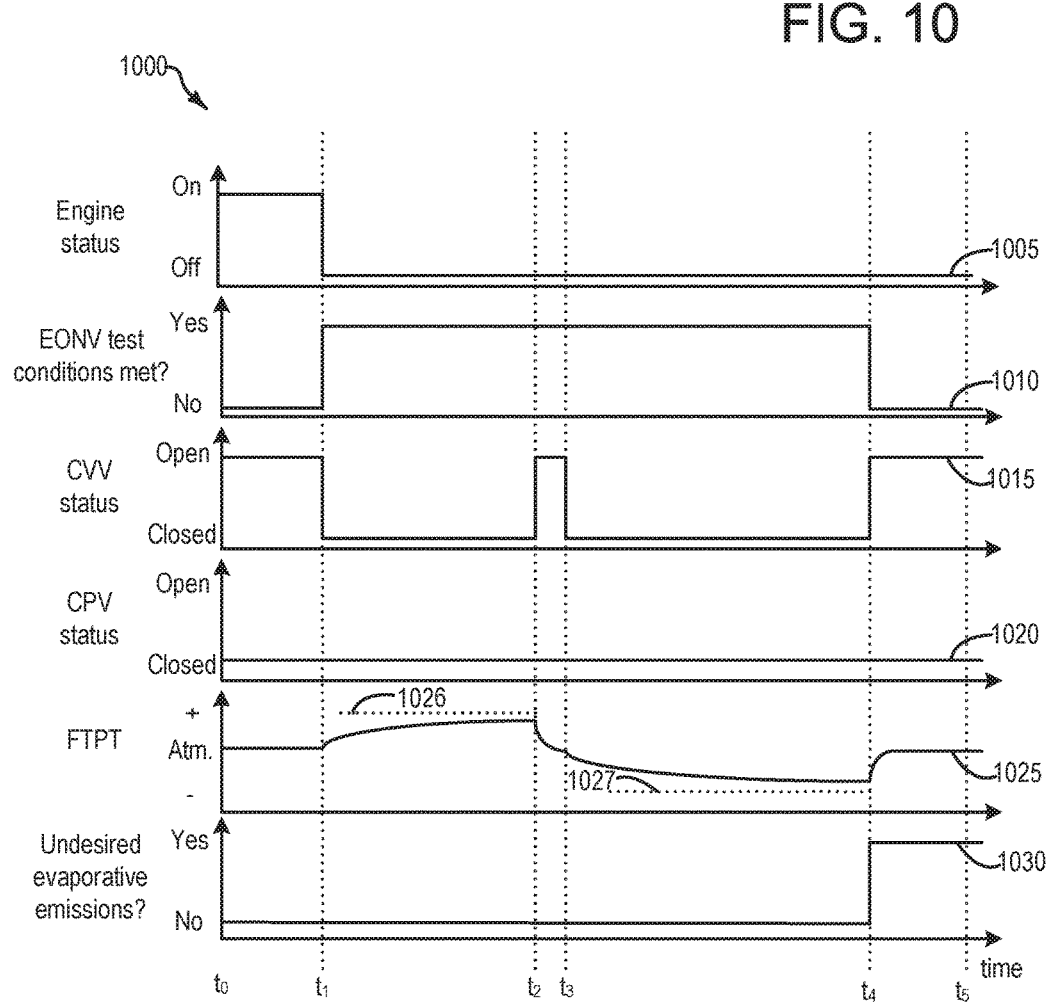
FIG. 10 shows an example timeline for conducting an EONV test for undesired evaporative emissions according to the methods of FIG. 8 and FIG. 9.
Figure 12:
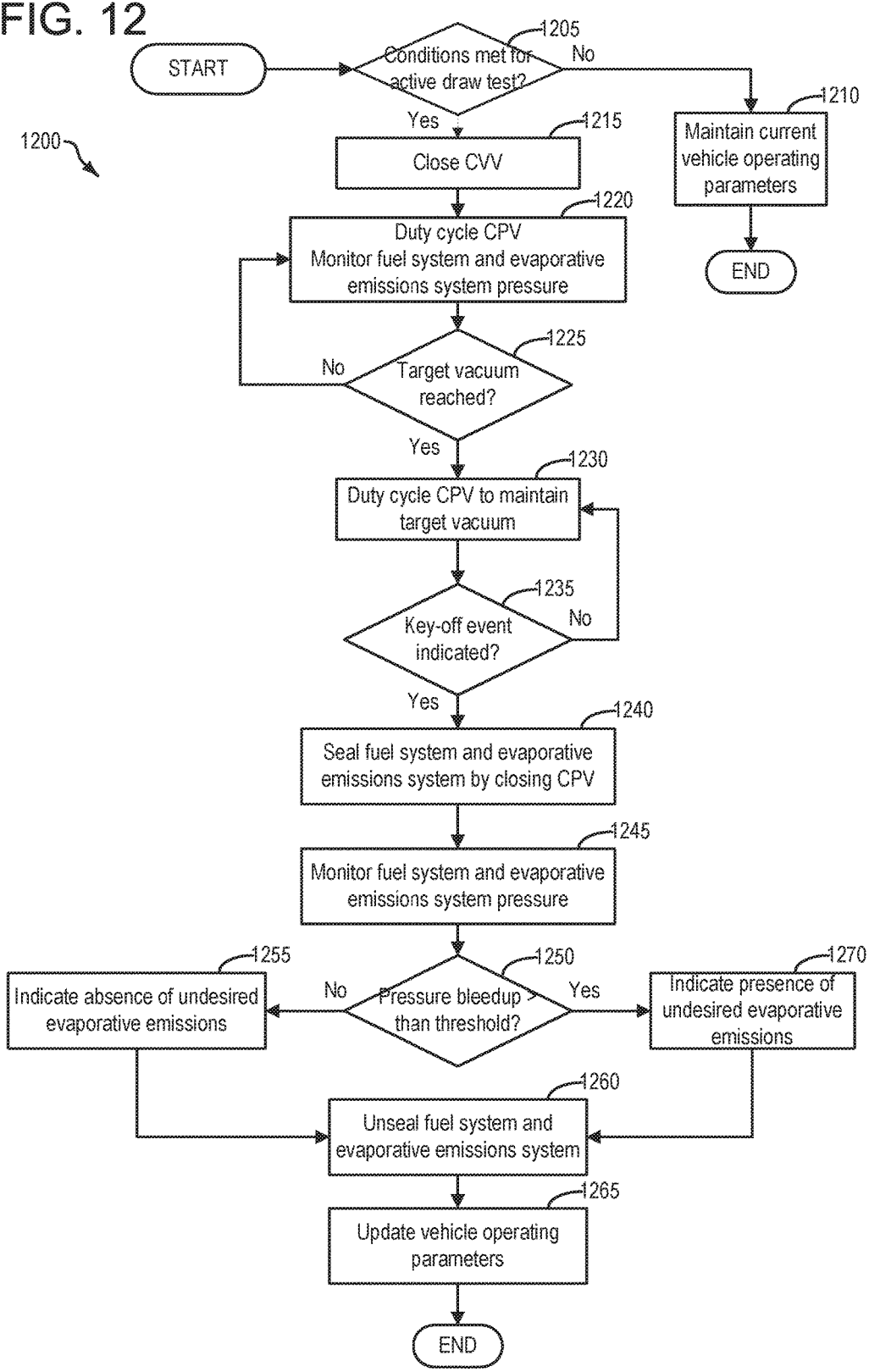
FIG. 12 shows a high level flowchart for conducting an active vacuum draw evaporative emissions test.
Figure 13:
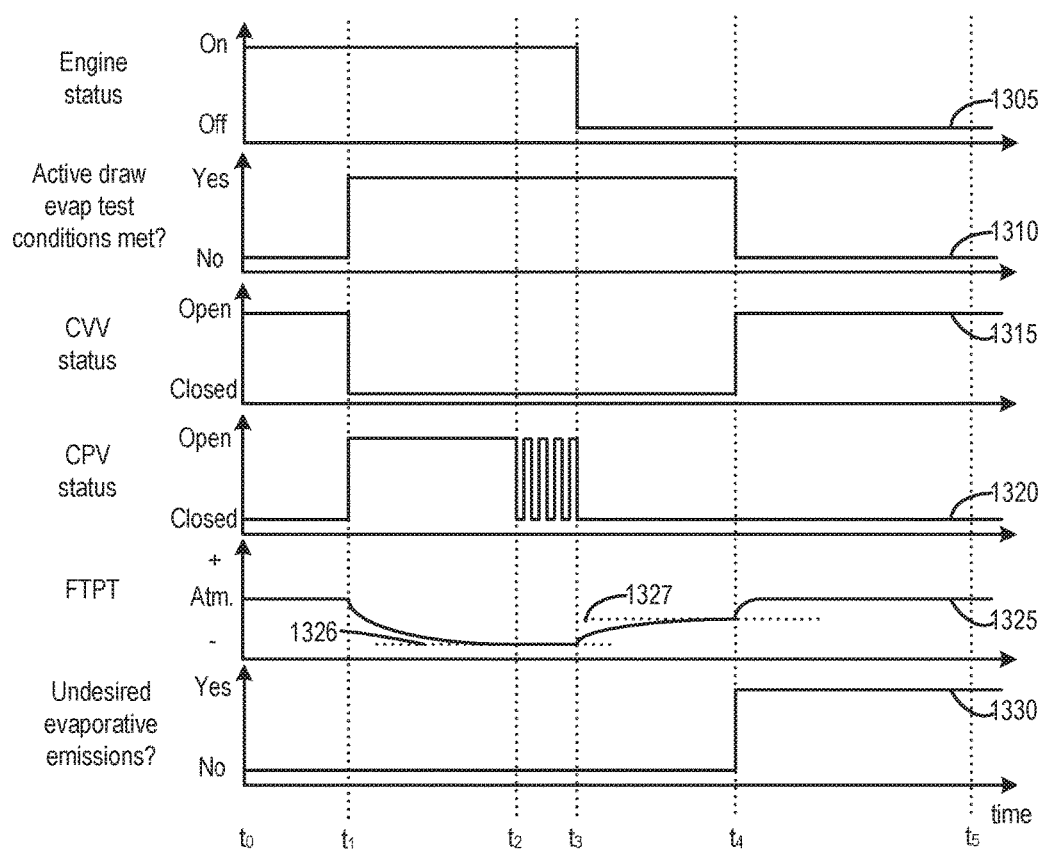
FIG. 13 shows an example timeline for conducting an active vacuum draw evaporative emissions test, according to the methods of FIG. 11 and FIG. 12.

Based on the learned travel routines, tests for undesired evaporative emissions may be scheduled accordingly. For example, responsive to one or more hill segments indicated for a particular travel route, a barometric pressure (BP) change evaporative emissions test may be scheduled, according to the method depicted at FIG. 5. A method for conducting the BP change evaporative emissions test is illustrated at FIG. 6. An example timeline for conducting a BP change evaporative emissions test is illustrated at FIG. 7. In some examples, responsive to one or more stops being indicated along a particular learned route, where the one or more stops is greater than a predetermined threshold duration, an engine off natural vacuum (EONV) test may be scheduled according to the method depicted at FIG. 8. A method for conducting the EONV test is illustrated at FIG. 9. An example timeline for conducting the EONV test is illustrated at FIG. 10. In still other examples, responsive to one or more stops being indicated along a particular learned route, where the one or more stops is less than the predetermined threshold duration, an active vacuum draw evaporative emissions test may be scheduled according to the method of FIG. 11. A method for conducting the active draw evaporative emissions test is illustrated at FIG. 12. An example timeline for conducting the active draw evaporative emissions test is illustrated at FIG. 13. In some examples, a particular route may include one or more stops, where the one or more stops may include predicted/learned stop durations greater than the predetermined threshold duration, less than the predetermined threshold duration, or some combination. Furthermore, a particular route may additionally include one or more hill segments where a BP change evaporative emissions test may be scheduled. Accordingly, an optimized schedule for conducting evaporative emissions tests for particular learned travel routes may be conducted according to the method illustrated at FIG. 14.

Figure 1:
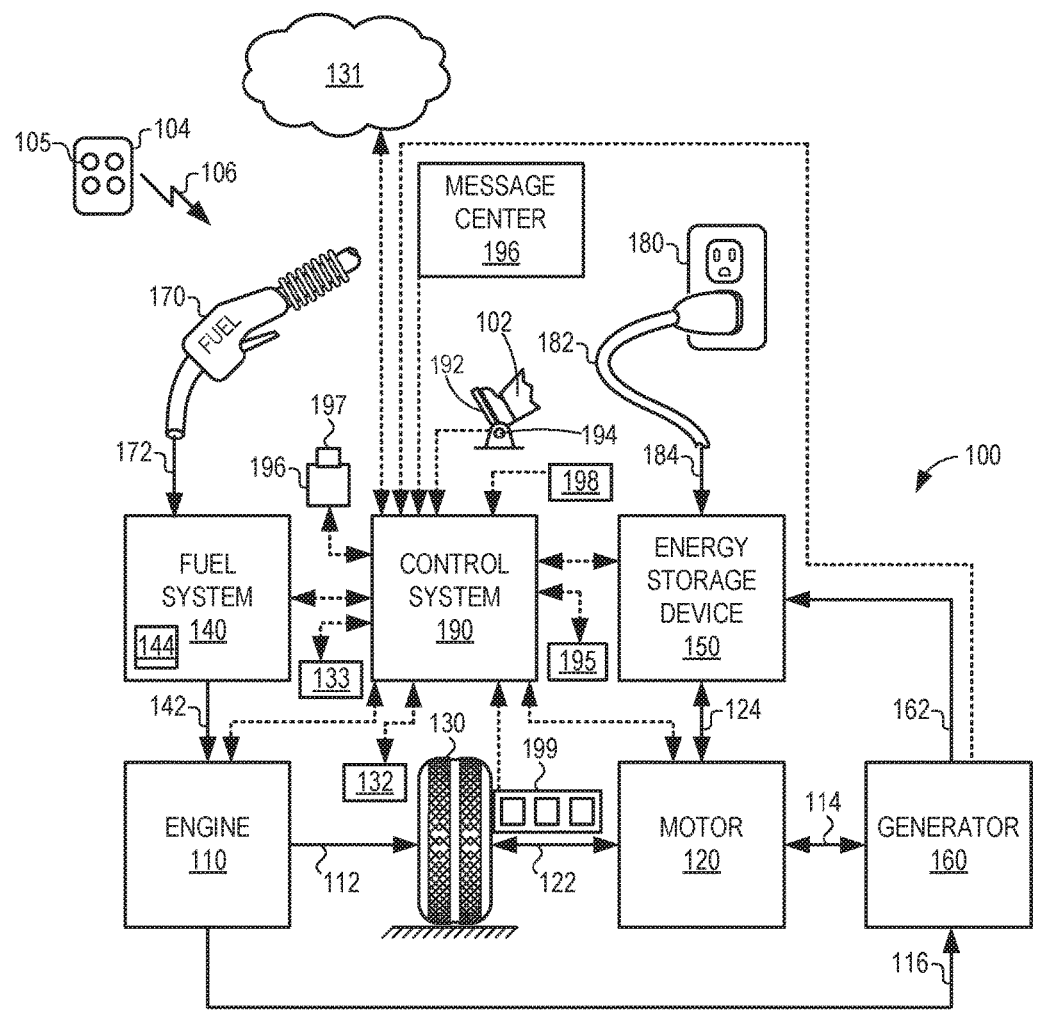
FIG. 1 schematically shows an example vehicle propulsion system.
Figure 2:
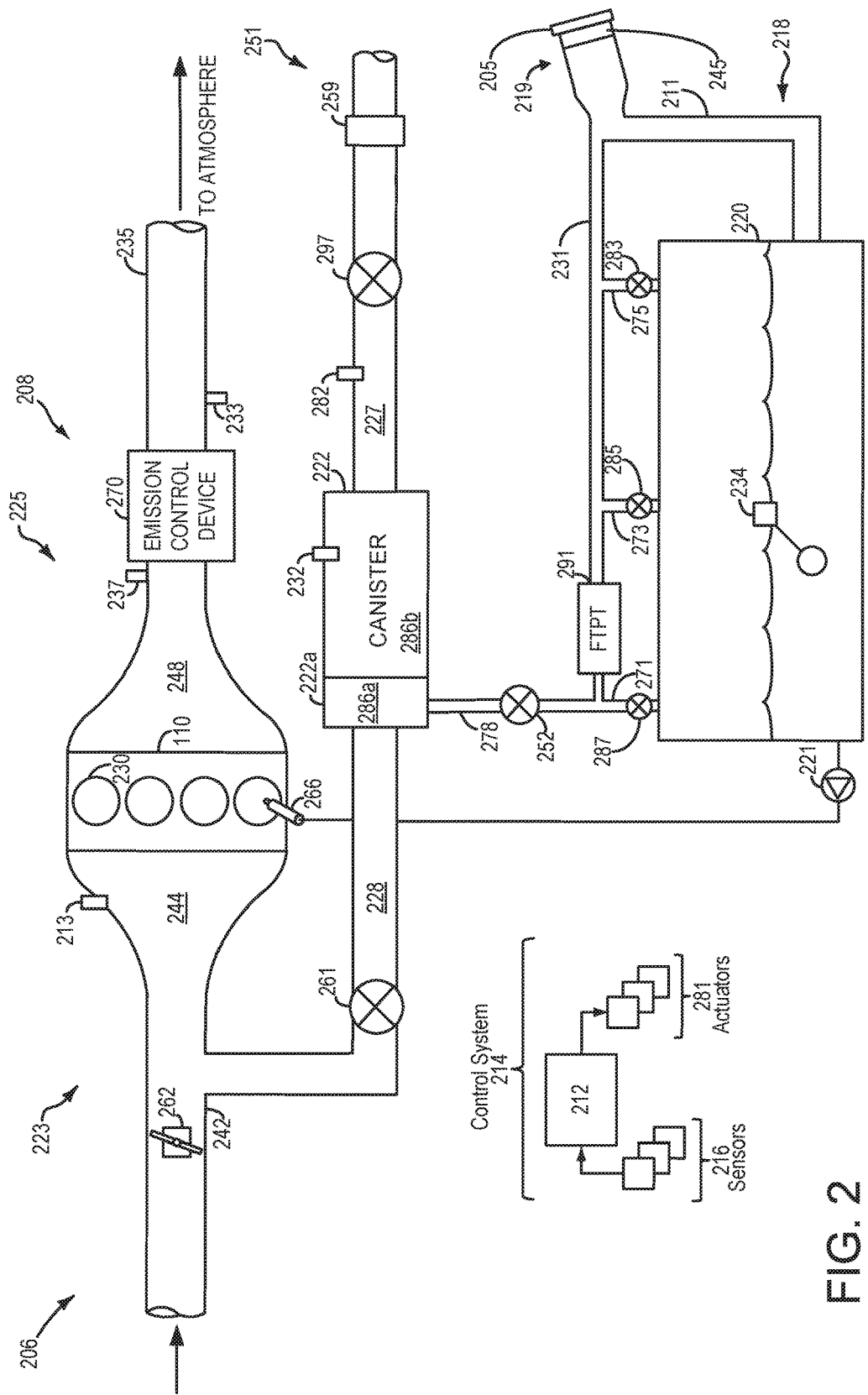
FIG. 2 schematically shows an example vehicle system with a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144

(e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art. In some examples, control system may be coupled to other vehicles or infrastructures via wireless network 131, in order to retrieve information that may be applicable to route-learning, as will be discussed in detail below.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In one example, information received from the GPS may be utilized in conjunction with route learning methodology, such that routes commonly traveled by a vehicle may be learned by the vehicle control system 190. In some examples, other sensors, such as lasers, radar, sonar, acoustic sensors, etc, (e.g. 133) may be additionally or alternatively utilized in conjunction with the onboard navigation system to conduct route learning of commonly traveled routes by the vehicle.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. In some examples, vehicle system 206 may be a hybrid electric vehicle system. However, it may be understood that the description herein may refer to a non-hybrid vehicle, for example a vehicle only-equipped with an engine and not an onboard energy storage device, without departing from the scope of the present disclosure.

The engine system 208 may include an engine 110 having a plurality of cylinders 230. The engine 110 includes an engine air intake 223 and an engine exhaust 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

Fuel system 218 may include a fuel tank 220 coupled to a fuel pump system 221. It may be understood that fuel tank 220 may comprise the same fuel tank as fuel tank 144 depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261. As will be discussed in detail below, in some example the FTIV may not be included, whereas in other examples, an FTIV may be included. Accordingly, the use of an FTIV will be discussed with regard to the methods described below, where relevant.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, pressure sensor 282, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. Example control routines are described herein with regard to FIG. 3, FIGS. 5-6, FIGS. 8-9, FIGS. 11-12, and FIG. 14.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode. In other examples, particularly with regard to the methods depicted in FIGS. 5-6, FIGS. 8-9, FIGS. 11-12, and FIG. 14, the controller may need to be awake in order to conduct such methods. In such an example, the controller may stay awake for a duration referred to as a time period where the controller is maintained awake to perform extended shutdown functions, such that the controller may be awake to conduct evaporative emissions test diagnostic routines. In another example, a wakeup capability may enable a circuit to wake the controller when refueling is underway.

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

While an EONV test is discussed above, other tests for undesired evaporative emissions may be conducted, such as a barometric pressure change evaporative emissions test which may rely on a change in altitude resulting in a pressure increase or decrease in a sealed fuel system and evaporative emissions system (e.g. closed CPV and closed CVV). The trapped pressure in the fuel system and evaporative emissions system may be monitored for bleed-up or bleed-down (depending on whether the vehicle decreased in altitude, or increased in altitude, respectively), to indicate the presence or absence of undesired evaporative emissions. Another example may include an active draw evaporative emissions test, which may include communicating engine intake manifold vacuum on the fuel system and evaporative emissions system (e.g. via an open CPV and a closed CVV), until a vehicle-off event associated with a learned stop is indicated. Responsive to the vehicle-off event being indicated, the fuel system and evaporative emissions system may be sealed (e.g. closed CPV and closed CVV), and pressure bleed-up monitored to indicate the presence or absence of undesired evaporative emissions. Such example methods will be discussed in greater detail below with regard to FIGS. 5-6, FIGS. 8-9, FIGS. 11-12, and FIG. 14.

Figure 3:
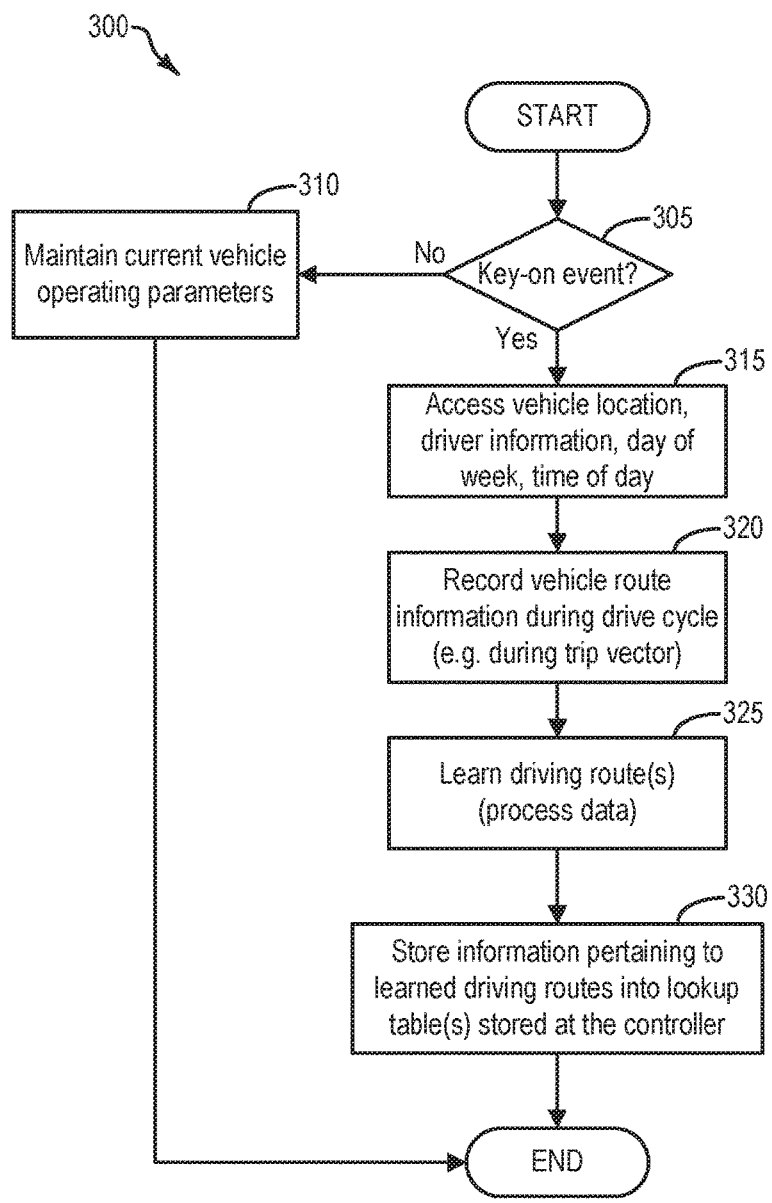
FIG. 3 shows a high level flowchart for an example method for machine learning of common driving routes.

Turning now to FIG. 3, a high level example method 300 for learning common driving routes driven in a vehicle, is shown. More specifically, method 300 may be utilized to learn common driving routes, and may further be utilized to learn/predict stops and hill segments associated with particular driving routes. It may be understood that "stops" herein may refer to vehicle-off events (e.g. key-off events). Time durations for learned/predicted stops corresponding to a particular driving route may be stored in lookup table(s) stored at the vehicle controller. Furthermore, information pertaining to learned/predicted hill segments for particular learned/predicted driving routes may similarly be stored in lookup table(s) stored at the vehicle controller. Still further, a final destination corresponding to particular learned/predicted driving route(s) may be determined and stored in lookup table(s) stored at the vehicle controller. Such information may be utilized in order to schedule appropriate evaporative emissions test diagnostic procedures, as will be discussed in detail below.

Method 300 will be described with reference to the systems described herein and shown in FIGS. 1-2, though it should be understood that similar methods may be applied to other systems without departing from the scope of this disclosure. Method 300 may be carried out by a controller, such as controller 212 in FIG. 2, and may be stored at the controller as executable instructions in non-transitory memory. Instructions for carrying out method 300 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, canister vent valve (CVV) (e.g. 297), canister purge valve (CPV) (e.g. 261), etc., according to the methods depicted below.

Method 300 begins at 305 and may include indicating whether a key-on event is indicated. A key-on event may comprise an ignition key being utilized to start a vehicle either in an engine-on mode, or an electric only mode of operation. In other examples, a key-on event may comprise an ignition button on the dash, for example, being depressed. Other examples may include a key-fob (or other remote device including smartphone, tablet, etc.) starting the vehicle in either an engine-on mode, or an electric-only mode of operation. If, at 305, a key-on event is not indicated, method 300 may proceed to 310, and may include maintaining current vehicle operating parameters. For example, at 310, method 300 may include maintaining a CPV, CVV, engine, etc., in their current conformations and or current modes of operation. Method 300 may then end.

Returning to 305, responsive to a key-on event being indicated, method 300 may proceed to 315, and may include accessing vehicle location, driver information, day of the week (DOW), time of day (TOD), etc. A driver's identity may be input by the driver, or inferred based on driving habits, seat position, cabin climate control preferences, voice activated commands, etc. Vehicle location may be accessed via an onboard navigation system, for example via GPS, or other means such as via wireless communication with the internet.

Proceeding to 320, method 300 may include recording vehicle route information during the drive cycle commencing from the key-on event. In some examples, vehicle route information may be divided into one or more segments, with the one or more segments being bordered by a key-on event indicating a start location, and a key-off event indicating a final destination. However, it may be understood that there may be one or more stops between a key-on event signaling the start of a route, and a key-off event indicating arrival at a final destination. Such stop events may be opportunities to conduct evaporative emissions test diagnostics depending on the duration of the stops, as will be discussed in further detail below.

At 320, the vehicle controller may continuously collect data from various sensor systems and outside sources regarding the vehicle's operations/conditions, location, traffic information, local weather information, etc. The data may be collected by, for example, GPS (e.g. 132), inertial sensors (e.g. 199), lasers, radar, sonar, acoustic sensors, etc (e.g. 133). Other feedback signals, such as input from sensors typical of vehicles may also be read from the vehicle. Example sensors may include tire pressure sensors, engine temperature sensors, brake heat sensors, brake pad status sensors, tire tread sensors, fuel sensors, oil level and quality sensors, and air quality sensors for detecting temperature, humidity, etc. Still further, at 320, the vehicle controller may also retrieve various types of non-real time data, for example information from a detailed map, which may be stored in at the controller or which may be retrieved wirelessly.

Accordingly, data regarding a particular vehicle driving route, or trip vector, may be obtained and stored at the vehicle controller during the course of the vehicle being driven along the particular route. Proceeding to 325, method 300 may include processing the data to establish predicted/learned driving routes. For example, numerous trip vectors and corresponding information may be obtained and stored at the vehicle controller, such that predicted/learned driving routes may be achieved with high accuracy. In some examples, a vehicle may travel route(s) that are not frequently traveled (e.g. not "common"). Thus, it may be understood that route information that is not correlated significantly with commonly driven routes may be periodically forgotten, or removed, from the vehicle controller, in order to prevent the accumulation of exorbitant amounts of data pertaining to vehicle travel routines.

In some examples data collected from the vehicle travel routines including GPS data may be applied to an algorithm that feeds into one or more machine learning algorithms to determine common vehicle travel routes. Such an example is meant to be illustrative, and is not meant to be limiting. For example, any commonly used methodology for vehicle route learning may be utilized via the vehicle controller in order to establish learned travel routes without departing from the scope of this disclosure.

Learning driving routes at 325 may include determining hill segments for particular driving routes for which a pressure change yield may be greater than a predetermined pressure change yield threshold for a sealed fuel system and evaporative emissions system. Learning driving routes at 325 may further include determining stops between and including a starting destination and a final destination. For example, learning driving routes at 325 may include learning/predicting stops (e.g. vehicle-off events) that are typically less than a predetermined time duration (e.g. less than 45 minutes), and may further include learning/predicting stops that are typically greater than the predetermined time duration (e.g. greater than 45 minutes). As discussed above and which will be discussed in further detail below, such information may be utilized to schedule evaporative emissions test diagnostics.

Proceeding to 330, method 300 may include storing information pertaining to learned driving routes into one or more lookup table(s) at the vehicle controller. Such information may include segments of particular vehicle routes, and predicted/learned pressure change yield(s) for a sealed fuel system and evaporative emissions system corresponding to elevation changes (e.g. hills) for each segment. Furthermore, such information stored in lookup table(s) may include an indication of segments in which a stop is indicated, and may further include an indication of a learned/ predicted time duration of each indicated stop. Still further, information stored in the lookup table(s) may include an indication of whether an evaporative emissions test procedure may be conducted for each segment of a particular learned driving route, and may further include an indication of what type of evaporative emissions test may be conducted for each segment where an evaporative emissions test is indicated to be potentially conducted. Such lookup tables may be utilized during particular vehicle driving routines in order to schedule evaporative emissions test diagnostic procedures such that robust results may be obtained, and where the scheduling of evaporative emissions tests may result in premature aborting of initiated evaporative emissions tests being reduced or eliminated.

Turning now to FIG. 4A, a schematic of an example driving route 400 is illustrated. More specifically, driving route 400 may comprise a learned driving route, as discussed above with regard to FIG. 3. Driving route 400 may be divided into a number of individual segments, for example segments 401, 402, 403, 404, 405, 406, 407, 408, and 409. Segment 402 may comprise a segment of driving route 400 that corresponds to an altitude decrease that may be determined to result in a vacuum yield of −8 InH2O or greater, for example, for a sealed fuel system and evaporative emissions system of a particular vehicle. Similarly, segment 406 may comprise a segment of driving route 400 that corresponds to an altitude decrease that may be determined to result in a vacuum yield of −8 InH2O or greater, for example, for a sealed fuel system and evaporative emissions system of the particular vehicle. In some examples, a determination of segments of a driving route in which an expected vacuum yield (for a sealed evaporative emissions system and fuel system), or alternatively, an expected pressure yield (for a sealed evaporative emissions system and fuel system where altitude is increasing) is greater than a predetermined threshold (e.g. −8 InH2O or 8 InH2O), may be indicated responsive to a learned driving route. In other examples, segments in which an expected vacuum or pressure yield for a sealed evaporative emissions system and fuel system is greater than a predetermined threshold may be determined responsive to a vehicle operator inputting a programmed route into an onboard navigation system (GPS system). For example, a vehicle-operator inputted route may be analyzed for hill segments that may result in a vacuum or pressure yield greater than predetermined threshold(s) for a sealed fuel system and evaporative emissions system.

Driving route 400 further includes two potential stops, corresponding to first stop 410, and second stop 412. As discussed above, first stop 410 and second stop 412 may be predicted or determined based on a learned route from a driver usage profile.

Turning to FIG. 4B, an example table 420 is illustrated which may be generated and stored at the vehicle controller (e.g. 212). Example table 420 may represent driving route 400, depicted at FIG. 4A. Specifically, example table 420 may include segments 401-409, where segments 401-409 may correspond to segments 401-409 depicted above at FIG. 4A. A predicted/learned pressure change yield for a sealed evaporative emissions system and fuel system, for each segment, may be stored at example table 420. Only those segments of driving route 400 in which predicted/learned pressure change yield is greater than a predetermined pressure change yield threshold (e.g. >−8 InH2O, or >8 InH2O) may be segments whereby a barometric pressure (BP) change evaporative emission test may be conducted. More specifically, segment 402 may comprise a segment of driving route 400 in which a decrease in altitude may result in development of a vacuum yield of −9 InH2O for a sealed fuel system and evaporative emissions system. Accordingly, a BP change evaporative emissions test may be conducted during segment 402, as indicated at table 420. Similarly, segment 406 may comprise a segment of driving route 400 in which a decrease in altitude may result in development of a vacuum yield of −11 InH2O for a sealed fuel system and evaporative emissions system. Accordingly, a BP change evaporative emissions test may be conducted during segment 406, as indicated at table 420. A detailed example of a BP change evaporative emissions test will be discussed below with regard to the methods illustrated in FIGS. 5-6. In some examples, an amount of vacuum predicted to be achieved for a sealed fuel system and evaporative emissions system as a function of altitude change may be based on fuel level. For example, an amount of vacuum achievable may be less as fuel level is lowered. Thus, in some examples, the vacuum level achievable may be based on a low fuel level (e.g. less than ¼ full, for example).

Furthermore, segments 401, 403, 404, 405, 407, 408, and 409 may represent segments in which a BP change evaporative emissions test may not be conducted, as the predicted/learned levels of vacuum/pressure yield for a sealed fuel system and evaporative emissions system are less than the predetermined pressure change yield threshold (e.g. <−8 InH2O, or <8 InH2O). Accordingly, a BP change evaporative emissions test may not be conducted on such segments where the predicted/learned vacuum/pressure yield is less than the predetermined pressure change yield threshold (e.g. segments 401, 403, 404, 405, 407, 408, and 409).

Example table 420 may further include predicted/learned stops along driving route 400. Accordingly, first stop 410 in segment 403 may comprise a stop that is predicted/learned to be less than 45 minutes in duration. Because first stop 410 may comprise a stop (e.g. vehicle-off event) that is predicted/learned to be less than 45 minutes in duration, an engine off natural vacuum (EONV) test may not be conducted at first stop 410. More specifically, as discussed above and which will be discussed in further detail below, an EONV test may comprise an evaporative emissions test that may last 45 minutes. Thus, if a stop comprises a duration of less than 45 minutes, the EONV test may not be completed prior to the vehicle being once again driven. An EONV test that is initiated, but not finished may impact EONV test completion rates, may increase canister loading, may result in undesired usage of valves being commanded open/closed to conduct the test, and may in some examples result in gas station premature shutoffs of a refueling dispenser, etc. Accordingly, by predicting which stops are less than 45 minutes, EONV tests may be prevented from executing for such stops.

For predicted/learned stops that are expected to be less than 45 minutes, a different approach may be utilized such that an evaporative emissions test diagnostic may be conducted in an expedited fashion. Specifically, an active vacuum draw evaporative emissions test may be conducted. An active vacuum draw evaporative emissions test may include commanding open a canister purge valve (CPV) and commanding closed a canister vent valve (CVV) to draw vacuum on a fuel system and evaporative emissions system prior to engine shutdown. Responsive to engine shutdown, the fuel system and evaporative emissions system may be sealed from atmosphere and from engine intake, and pressure bleedup may be monitored. Pressure bleedup less than a pressure bleedup threshold, or a pressure bleedup rate less than a pressure bleedup rate threshold may indicate that the fuel system and evaporative emissions system is free from undesired evaporative emissions. Such an example of an active draw evaporative emissions test will be discussed in further detail below with regard to the methods depicted at FIGS. 11-12.

Accordingly, as stop 410 during segment 403 is indicated to be predicted/learned to be less than 45 minutes in duration, the type of evaporative emissions test that may be scheduled for stop 410 may include an active vacuum draw evaporative emissions test. Such information may be included in example table 420 and may be stored at the controller.

Stop 412, indicated to take place during segment 408, may be predicted/learned to be greater than 45 minutes in duration. Because the stop is greater than 45 minutes, an EONV test may be conducted, as indicated at table 420. A typical example of an EONV test will be described in detail below with regard to the methods depicted at FIGS. 8-9. Briefly, as discussed above, an EONV test may include sealing a fuel system and evaporative emissions system responsive to an engine shutoff event, and monitoring a pressure increase. If the pressure increase does not reach the positive pressure threshold, the system may be unsealed and returned to atmospheric pressure (e.g. pressure may be relieved), after which the system may be resealed and a vacuum build may be monitored. Responsive to vacuum in the fuel system and evaporative emissions system not reaching a vacuum threshold within the timeframe of the EONV test (e.g. 45 minutes), undesired evaporative emission may be indicated. Alternatively, if either the positive pressure threshold, or the vacuum threshold is reached during the EONV test, it may be indicated that the fuel system and evaporative emissions system are free from undesired evaporative emissions. In some examples, the positive pressure threshold and the vacuum threshold may be adjusted as a function of fuel level, fuel reid vapor pressure, ambient temperature, weather conditions, etc.

However, while an EONV test may be conducted at predicted/learned stops greater than 45 minutes, there may be circumstances where it may be beneficial to conduct an active vacuum draw evaporative emissions test. Such examples may include circumstances where conditions for conducting an EONV test are not indicated to be met. For example, and which will be discussed in greater detail below, if heat rejection from the engine to the fuel system is not indicated to be greater than a heat rejection inference threshold, then an active vacuum draw evaporative emissions test may be conducted instead. Accordingly for stop 412, and for the predicted/learned end destination, where both stops are predicted/learned to be greater than 45 minutes in duration, either an EONV test or an active vacuum draw evaporative emissions test may be conducted, depending on whether conditions are met for conducting the EONV test or not, for example. Other examples where an EONV test may not be conducted may include indications of wind speeds above a wind speed threshold, or other weather conditions that may render the EONV unlikely to provide robust results.

Turning to FIG. 5, a high level flowchart for an example method 500 for scheduling and conducting a barometric pressure (BP) change evaporative emissions test, is shown. More specifically, method 500 may be enabled responsive to a commencement of a drive cycle. In other words, responsive to a drive cycle being initiated, method 500 may be carried out. Commencement of a drive cycle may include a key-on event, for example.

Method 500 will be described with reference to the systems described herein and shown in FIGS. 1-2, though it should be understood that similar methods may be applied to other systems without departing from the scope of this disclosure. Method 500 may be carried out by a controller, such as controller 212 in FIG. 2, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, canister vent valve (CVV) (e.g. 297), canister purge valve (CPV) (e.g. 261), etc., according to the methods depicted below.

Method 500 begins at 505 and may include indicating whether a key-on event is indicated. A key-on event may comprise an ignition key being utilized to start a vehicle either in an engine-on mode, or an electric only mode of operation. In other examples, a key on event may comprise an ignition button on the dash, for example, being depressed. Other examples may include a key-fob starting the vehicle in either an engine-on mode, or an electric-only mode of operation. If, at 505, a key-on event is not indicated, method 500 may proceed to 510, and may include maintaining current vehicle operating parameters. For example, at 510, method 500 may include maintaining a CPV, CVV, engine, etc., in their current conformations and or current modes of operation. Method 500 may then end.

Returning to 505, if a key-on event is indicated, method 500 may proceed to 515. At 515, method 500 may include accessing driving route information. For example, accessing driving route information at 515 may include retrieving learned driving route information from the vehicle controller. More specifically, a particular learned driving route may be indicated to be the same as the current driving route. In other words, the current driving route may be matched with a learned driving route with a high probability. A learned driving route may be matched to the current driving route based on a number of variables, including vehicle location, time of day, date, day of week, trajectory, and/or driver identity. A driver's identity may be input by the driver, or may be inferred based on driving habits, seat position, cabin climate control preferences, voice activated commands, etc. In another example, a vehicle operator may input one or more destinations into an onboard navigation system (e.g. GPS), such that accessing driving route information at 515 may include accessing the vehicle operator inputted driving route information. In some examples, accessing driving route information may include accessing a lookup table, such as lookup table 420 depicted above at FIG. 4B, responsive to a particular driving route being identified with high probability as the current driving route.

Proceeding to 520, method 500 may include indicating whether any segments of the current drive cycle contain altitude changes in which a pressure change yield may be greater than a predetermined pressure change yield threshold for a sealed fuel system and evaporative emissions system. As discussed above, a pressure change yield threshold may comprise a vacuum development of −8 InH2O or greater, or a pressure build of 8 InH2O or greater.

If, at 520, no hill segments are identified in the predicted/learned current drive cycle for which vacuum or pressure yield is greater than the predetermined pressure change yield for a sealed fuel system and evaporative emissions system, method 500 may proceed to 525. At 525, method 500 may include proceeding with the current drive cycle without scheduling a barometric pressure (BP) change evaporative emissions test. Method 500 may then end.

Alternatively, at 520, responsive to an indication that the current drive cycle includes one or more hill segments in which a BP change evaporative emissions test may be conducted, method 500 may proceed to 530. At step 530, method 500 may include scheduling the BP change evaporative emissions test for the appropriate segment(s) of the current drive cycle. In some examples, a BP change evaporative emissions test may be scheduled for one of the segment(s), if more than one segment is indicated to comprise a hill segment for which a BP change evaporative emissions test may be conducted. As one example in a case where more than one segment is indicated to comprise a hill segment for which a BP change evaporative emissions test may be conducted, a BP change evaporative emissions test may be scheduled for the segment in which predicted/learned BP change is the greatest. However, in other examples, the BP change evaporative emissions test may be scheduled for the segment in which predicted/learned BP change is the lowest (but still above the predetermined pressure change yield threshold). In still other examples, the BP change evaporative emissions test may be scheduled for the segment in which BP change rate is the fastest. In still further examples, more than one BP change evaporative emissions test may be scheduled for a current drive cycle responsive to an indication of more than one segment in which predicted/learned vacuum/pressure yield is indicated to be greater than a predetermined pressure/vacuum yield for a sealed fuel system and evaporative emission system. In still other examples, the BP change evaporative emissions test may be scheduled for the segment wherein a flat (e.g. altitude not increasing or decreasing) stretch of a predetermined length proceeds the hill segment such that test results may be robust and without complicating factors such as changing BP.

Responsive to scheduling one or more BP change evaporative emissions test(s) at 530, method 500 may proceed to 535. At 535, method 500 may include conducting the BP change evaporative emissions test at the appropriate point in the current drive cycle. Such a method for conducting the BP change evaporative emissions test is depicted in detail at FIG. 6. Responsive to conducting the BP change evaporative emissions test, method 500 may end.

Turning to FIG. 6, a high level flowchart for an example method 600 for conducting a barometric pressure (BP) change evaporative emissions test, is shown. More specifically, such a test may be scheduled for one or more segments of a driving cycle, as discussed above with regard to method 500 depicted above at FIG. 5. Responsive to conditions being met for conducting the BP change evaporative emissions test, such a test may be conducted via method 600 discussed below.

Method 600 will be described with reference to the systems described herein and shown in FIGS. 1-2, though it should be understood that similar methods may be applied to other systems without departing from the scope of this disclosure. Method 600 may be carried out by a controller, such as controller 212 in FIG. 2, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, canister vent valve (CVV) (e.g. 297), canister purge valve (CPV) (e.g. 261), etc., according to the methods depicted below. In examples where a fuel tank isolation valve (FTIV) (e.g. 252) is included in the vehicle, the controller may control the FTIV as will be discussed below.

Method 600 begins at 602 and may include indicating whether conditions are met for conducting a BP change evaporative emissions test. In one example, conditions being met may include a scheduled BP change evaporative emissions test location being reached. Such an indication may be provided via an onboard navigation system (e.g. GPS). In other examples, if a GPS is not available, conditions being met may include the scheduled BP change evaporative emissions test location being reached as indicated via a lookup table, where the lookup table includes learned information from common routes, as discussed above with regard to FIGS. 4A-4B. Additionally or alternatively, in some examples, a vehicle BP sensor (e.g. 213) may be utilized to indicate conditions are met for conducting the BP change evaporative emissions test. As an example, a pressure change of a predetermined amount may be communicated to the vehicle controller to provide an indication that the vehicle is undergoing a change in altitude. Such information may be combined with information from learned common routes, such that it may be determined whether conditions are met for conducting the BP change evaporative emissions test. In some examples, conditions being met for conducting the BP change evaporative emissions test may include an indication that the fuel vapor storage canister (e.g. 222) is not being purged.

If, at 602, it is indicated that conditions are not met for conducting the BP change evaporative emissions test, method 600 may proceed to 604, and may include maintaining current vehicle operating parameters. For example, the CPV, CVV, and FTIV (where included) may be maintained in their current operational states. Method 600 may then end.

Returning to 602, responsive to conditions being indicated to be met for conducting the BP change evaporative emissions test, method 600 may proceed to 605. At 605, method 600 may include closing the CVV to seal the fuel system and evaporative emissions system. While not explicitly shown, in examples where a vehicle system includes an FTIV (e.g. 252), the FTIV may be first commanded open in order to allow pressure in the fuel system and evaporative emissions system to reach atmospheric pressure, prior to commanding closed the CVV. Furthermore, while not explicitly shown, it may be understood that the CPV is additionally maintained (or commanded) closed at 605.

Proceeding to 610, method 600 may include monitoring fuel system and evaporative emissions system pressure. Pressure in the fuel system and evaporative emissions system may be monitored via a fuel tank pressure transducer (FTPT) (e.g. 291). With the fuel system and evaporative emissions system sealed during a hill segment ascent or descent, either positive pressure with respect to atmospheric pressure may develop, or a vacuum (e.g. negative pressure with respect to atmospheric pressure) may develop. More specifically, positive pressure may develop if the vehicle is increasing in altitude (BP decreasing), and negative pressure may develop responsive to the vehicle decreasing in altitude (BP increasing). Accordingly, proceeding to 615, method 600 may include indicating whether a first target pressure is reached. The first target pressure may comprise a pressure where, if reached, it may be indicated that the fuel system and evaporative emissions system are free from gross undesired evaporative emissions (e.g. 0.09"). More specifically, if the first target pressure is not reached during the hill ascent or decent, then undesired evaporative emissions may be indicated to be escaping from a source the size of 0.09" or greater. However, if the first target pressure is reached during the hill ascent or decent, then it may be indicated that undesired evaporative emissions are not escaping from a source the size of 0.09" or greater.

Accordingly, at 615 it may be indicated as to whether the first target pressure threshold is reached. If the first target pressure is not indicated to be reached at 615, method 600 may proceed to 620, and may include indicating whether the end of the predicted/learned hill segment has been reached. Such an indication may be determined via a BP sensor if the vehicle is equipped, GPS, via information from learned routes, etc. If, at 620, it is indicated that the end of the hill segment has not yet been reached, method 620 may return to 610, and may include continuing to monitor fuel system and evaporative emissions system pressure. Alternatively, if at 620 it is indicated that the end of the hill segment has been reached, method 600 may proceed to 625. At 625, method 600 may include indicating gross undesired evaporative emissions (e.g. 0.09" or greater). Such an indication may be stored at the controller, for example. Furthermore, a malfunction indicator light (MIL) may be illuminated on the vehicle dash to indicate to the vehicle operator of the need to service the vehicle.

Proceeding to 630, method 600 may include taking mitigating action responsive to the indication of gross undesired evaporative emissions. In one example, taking mitigating action may include operating the vehicle in an electric mode of operation whenever possible, such that undesired evaporative emissions may be reduced until the source of the undesired evaporative emissions has been remedied. Method 600 may then end.

Returning to 615, responsive to the first target pressure being reached, method 600 may proceed to 635. At 635, method 600 may include indicating an absence of gross undesired evaporative emissions. Such an indication may be stored at the vehicle controller, for example.

Proceeding to 640, method 600 may include maintaining fuel system and evaporative emissions pressure at the target pressure until the end of the hill segment, or change in altitude, is reached, or completed. Accordingly, at 645, method 600 may include duty cycling the CVV such that the target pressure is maintained during the duration the vehicle is ascending or descending the hill. By duty cycling the CVV, pressure in the fuel system and evaporative emissions system may be kept from building to pressures greater than the target pressure, for example. More specifically, method 600 may include indicating whether the change in altitude is complete, and responsive to pressure in the sealed fuel system and evaporative emissions system reaching the predetermined pressure change yield threshold (also referred to herein as target pressure) prior to the change in altitude being complete, maintaining pressure in the fuel system and evaporative emissions system at the predetermined pressure change yield threshold until the change in altitude is indicated to be complete.

Proceeding to 650, method 600 may include indicating whether the end of the hill segment, or change in altitude, has been reached, or completed. As discussed above, such an indication may be indicated via a BP sensor if the vehicle is equipped, GPS, via information from learned routes, etc. If, at 650, the end of the hill segment is not yet indicated to have been reached, method 600 may include maintaining pressure in the fuel system and evaporative emissions system at the predetermined target pressure, which may include duty cycling the CVV, as discussed above.

Alternatively, responsive to an indication that the end of the hill segment, or change in altitude, has been reached or completed, method 600 may proceed to 655, and may include commanding or maintaining closed the CVV. While not explicitly illustrated, it may be understood that the CPV may be maintained closed at 655. Accordingly, the fuel system and evaporative emissions system may be sealed from atmosphere and from engine intake. With the target positive pressure or target vacuum (depending on whether the vehicle increased in altitude or decreased in altitude, respectively) reached, and with the fuel system and evaporative emissions system sealed from atmosphere and engine intake, pressure in the fuel system and evaporative emissions system may be monitored for a duration at 660, to indicate the presence or absence of non-gross undesired evaporative emissions (e.g. 0.04" or greater, but less than 0.09").

Thus, proceeding to 665, method 600 may include indicating whether a pressure change in the fuel system and evaporative emissions system is less than a predetermined threshold. In some examples, at 665, method 600 may include indicating whether a pressure change rate in the fuel system and evaporative emissions system is less than a predetermine pressure change rate threshold. The predetermined threshold, or predetermined pressure change rate threshold may comprise threshold(s) where, if reached or exceeded, the presence of non-gross undesired evaporative emissions may be indicated. In some examples, it may be understood that the predetermined threshold and/or predetermined pressure change rate thresholds may be adjusted as a function of ambient temperature and fuel level.

Responsive to a pressure change or pressure change rate in the fuel system and evaporative emissions system reaching or exceeding the predetermined pressure threshold, or predetermined pressure change rate threshold, method 600 may proceed to 670. At 670, method 600 may include indicating the presence of non-gross undesired evaporative emissions. Such an indication may be stored at the controller, for example. Furthermore, a MIL may be illuminated on the vehicle dash, for example, alerting the vehicle operator of the need to service the vehicle.

Proceeding to 675, method 600 may include unsealing the fuel system and evaporative emissions system. For example, unsealing the fuel system and evaporative emissions system may include commanding open the CVV such that pressure in the fuel system and evaporative emissions system may return to atmospheric pressure. While not explicitly illustrated, for vehicles equipped with an FTIV, the FTIV may be commanded closed responsive to an indication that the fuel system and evaporative emissions system has reached atmospheric pressure.

Proceeding to 680, method 600 may include updating the status of the fuel system and evaporative emissions system. For example, responsive to the indication of non-gross undesired evaporative emissions in the fuel system and evaporative emissions system, the controller may update a vehicle operating status to include operating the vehicle in an electric mode more frequently, to reduce the amount of undesired evaporative emissions that may be released to atmosphere. In another example, a canister purging schedule may be updated such that canister purging may be conducted more frequently, in order to route vapors that may otherwise potentially escape to atmosphere, to engine intake for combustion. Method 600 may then end.

Returning to 665, if it is indicated that a pressure change or a pressure change rate in the fuel system and evaporative emissions system did not reach or exceed the predetermined pressure threshold, method 600 may proceed to 685. At 685, method 600 may include indicating an absence of undesired evaporative emissions in the fuel system and evaporative emissions system. Such an indication may be stored at the controller, for example. Proceeding to 675, method 600 may include unsealing the fuel system and evaporative emissions system. As discussed above, unsealing the fuel system and evaporative emissions system may include commanding open the CVV to return the fuel system and evaporative emissions system to atmospheric pressure. As discussed, for vehicles with an FTIV, the FTIV may be commanded closed responsive to an indication that the fuel system and evaporative emissions system has reached atmospheric pressure.

Proceeding to 680, method 600 may include updating the status of the fuel system and evaporative emission system. As no undesired evaporative emissions were indicated to be present in the fuel system and/or evaporative emissions system, updating the status of the fuel system and evaporative emissions system at 680 may include maintain current operating parameters. Method 600 may then end.

Turning now to FIG. 7, an example timeline 700 is shown for conducting a barometric pressure (BP) change evaporative emissions test, according to the methods described herein and with regard to FIGS. 5-6, and as applied to the systems described herein and with reference to FIGS. 1-2. Timeline 700 includes plot 705, indicating an on or off status of a vehicle engine, over time. Timeline 700 further includes plot 710, indicating whether conditions are met for a BP change evaporative emissions test, and plot 715, indicating whether an end of a hill segment which the vehicle is traveling has been reached (yes) or not (no), over time. Timeline 700 further includes plot 720, indicating an open or closed status of a CVV (e.g. 297), and plot 725, indicating an open or closed status of a CPV (e.g. 261), over time. Timeline 700 further includes plot 730, indicating pressure in a vehicle fuel system and evaporative emissions system, over time. Pressure may be at atmospheric pressure (atm), or positive (+) or negative (−) with respect to atmospheric pressure. Line 731 represents a first target pressure threshold (herein also referred to as a predetermined pressure change yield threshold), which, if not reached, may indicate gross undesired evaporative emissions. Line 732 represents a predetermined pressure threshold which, if reached, may indicate non-gross undesired evaporative emissions. It may be understood that both the first target pressure threshold 731, and the predetermined pressure threshold 732 may be below atmospheric pressure (e.g. negative with respect to atmospheric pressure) when the vehicle is descending in elevation. Line 733 represents another first target pressure threshold (herein also referred to as a predetermined pressure change yield threshold), which, if not reached, may indicate gross undesired evaporative emissions. Line 734 represents another predetermined pressure threshold which, if reached, may indicate non-gross undesired evaporative emissions. It may be understood that both the first target pressure threshold 733 and the predetermined pressure threshold 734 may be above atmospheric pressure (e.g. positive with respect to atmospheric pressure) when the vehicle is ascending in elevation. Timeline 700 further includes plot 735, indicating whether undesired evaporative emissions are indicated in the fuel system and evaporative emissions system, over time.

At time t0, it may be understood that the vehicle is in operation, being propelled solely via electric power, as the engine is off, indicated by plot 705. However, conditions for conducting a BP change evaporative emissions test are not indicated to be met, as illustrated by plot 710. The vehicle has not yet begun a hill ascent, or descent, and as such, no indication that an end of a hill segment has been reached, is indicated, illustrated by plot 715. The CVV is open, and the CPV is closed, illustrated by plot 720 and 725, respectively. The fuel tank is at atmospheric pressure, illustrated by plot 730. In this example timeline, it may be understood that the vehicle does not have an FTIV. Thus, with the CVV open, the fuel tank is at atmospheric pressure. However, where appropriate in this description, the use of an FTIV for a vehicle equipped with an FTIV, will be discussed. Furthermore, because a BP change evaporative emissions test has not yet been conducted in the current drive cycle, undesired evaporative emissions are not indicated, illustrated by plot 735.

At time t1, conditions are indicated to be met for conducting a BP change evaporative emissions test. As discussed above, conditions being met for a BP change evaporative emissions test may include a scheduled BP change evaporative emissions test location being reached. Such an indication may be provided via a GPS, or via a lookup table that includes learned information from common routes, discussed above with regard to FIGS. 4A-4B. In some examples a vehicle BP sensor (e.g. 213) may be utilized to indicate conditions are met for conducting the BP change evaporative emissions test as discussed above with regard to FIG. 6.

Responsive to conditions being met for conducting the BP change evaporative emissions test, the CVV is commanded closed. More specifically, a signal may be sent via the controller to an actuator of the CVV, actuating the CVV closed. In this example illustration, it may be understood that at time t1, a vehicle descent in altitude commences. Accordingly, with the CVV and CPV closed, vacuum builds in the fuel system and evaporative emissions system between time t1 and t2 as the vehicle descends in elevation, as indicated by plot 730. While this example illustration depicts a vehicle without an FTIV, it may be understood that, responsive to conditions being met for conducting a BP change evaporative emissions test, for vehicles with an FTIV, the FTIV may be commanded open to relieve pressure in the fuel system, prior to sealing the fuel system and evaporative emissions system via closing the CVV.

At time t2, vacuum builds to the first target threshold, represented by line 731. The first target threshold may represent a threshold where, if reached, no gross undesired evaporative emissions are indicated, illustrated by plot 735. However, the end of the hill segment is not yet indicated to be reached, although the target vacuum has been reached. Thus, the CVV is duty cycled between time t2 and t3, to maintain the vacuum in the fuel system and evaporative emissions system at the target vacuum level, represented by line 731.

At time t3, the end of the hill segment is indicated to be reached. Such an indication may be provided via GPS (if the vehicle is equipped), via a lookup table based on learned driving routes, via a BP sensor, etc. Responsive to an indication that the end of the hill segment has been reached, the fuel system and evaporative emissions system may be sealed by closing the CVV and maintaining the CPV closed. Accordingly, between time t3 and t4, pressure in the fuel system and evaporative emissions system is monitored for pressure bleedup. In some examples, the timeframe for monitoring pressure bleedup may comprise a predetermined duration. Because pressure in the fuel system and evaporative emissions system remains below the predetermined threshold, indicated by line 732, no non-gross undesired evaporative emissions are indicated, illustrated by plot 735. In some examples, rather than a predetermined pressure threshold, a predetermined pressure change rate threshold may be utilized, to monitor a pressure change rate in the fuel system and evaporative emissions system. In such an example, no non-gross undesired evaporative emissions may be indicated responsive to a pressure change rate in the fuel system and evaporative emissions system below the predetermined pressure change rate threshold.

Responsive to an indication of an absence of undesired evaporative emissions at time t4, the CVV is commanded open, relieving pressure in the fuel system and evaporative emissions system such that pressure returns to atmospheric pressure. As the test is complete, conditions are no longer indicated to be met for conducting the BP change evaporative emissions test.

Sometime later, the vehicle is once again in operation. For example, the vehicle may have been shut off, and then another driving route may be commenced. At time t5, conditions are indicated to be met for conducting a BP change evaporative emissions test. In this example, at time t5, it may be understood that a hill ascent is being commenced by the vehicle. With conditions being met for conducting the BP change evaporative emissions test, the CVV is commanded closed, and as such, pressure in the fuel system and evaporative emissions system builds between time t5 and t6, the result of the vehicle ascending in altitude. As discussed above, for vehicles equipped with an FTIV, responsive to conditions for the BP change evaporative emissions test being met, the FTIV may be commanded open to relieve pressure in the fuel system and evaporative emission system, prior to commanding closed the CVV.

At time t6, the other first target pressure is reached, represented by line 733. However, the vehicle has not yet completed the hill ascent. Thus, between time t6 and t7, the CVV is duty cycled to maintain pressure in the fuel system and evaporative emissions system at the target pressure. Furthermore, because the other first target pressure was reached at time t6, gross undesired evaporative emissions are not indicated, illustrated by plot 735.

At time t7, it is indicated that the end of the hill segment has been reached. Accordingly, the fuel system and evaporative emissions system is sealed from atmosphere and from engine intake, via commanding closed the CVV and maintaining closed the CPV. Pressure in the fuel system and evaporative emissions system is next monitored for pressure bleed-down. In some examples, a monitored pressure bleed-down rate may be compared to a predetermined pressure bleed-down rate threshold. However, in this example illustration, a predetermined pressure threshold, represented by line 734, is utilized. For example, if pressure in the fuel system and evaporative emissions system reaches or exceeds the predetermined pressure threshold, then non-gross undesired evaporative emissions may be indicated.

At time t8, pressure in the fuel system and evaporative emissions system bleeds down to the predetermined pressure threshold represented by line 734. Accordingly, at time t8, non-gross undesired evaporative emissions are indicated, represented by plot 735. With non-gross undesired evaporative emissions indicated at time t8, conditions for conducting the BP change evaporative emissions test are no longer indicated, illustrated by plot 710. The CVV is commanded open to relieve pressure in the fuel system and evaporative emissions system. Accordingly, between time t8 and t9, pressure in the fuel system and evaporative emissions system returns to atmospheric pressure. For vehicles equipped with an FTIV, responsive to pressure in the fuel system and evaporative emissions system reaching atmospheric pressure, the FTIV may be commanded closed.

In some examples, while not explicitly illustrated herein, for vehicles with an FTIV, there may be opportunities to specifically diagnose the presence or absence of undesired evaporative emissions in either the fuel system or the evaporative emissions system. For example, a BP change evaporative emissions test may be first conducted with the FTIV open, as discussed above. If undesired evaporative emissions are indicated, a subsequent BP change evaporative emissions test may be conducted with the FTIV closed to isolate the source of the undesired evaporative emissions. For example, with the FTIV closed, pressure may be monitored separately in both the fuel system and the evaporative emissions system. Accordingly, each system (e.g. fuel system and evaporative emissions system) may be diagnosed separately following the same methodology as that for a coupled fuel system and evaporative emissions system. In this way, for vehicles with an FTIV, the source of undesired evaporative emissions may be more precisely indicated.

Figure 8:
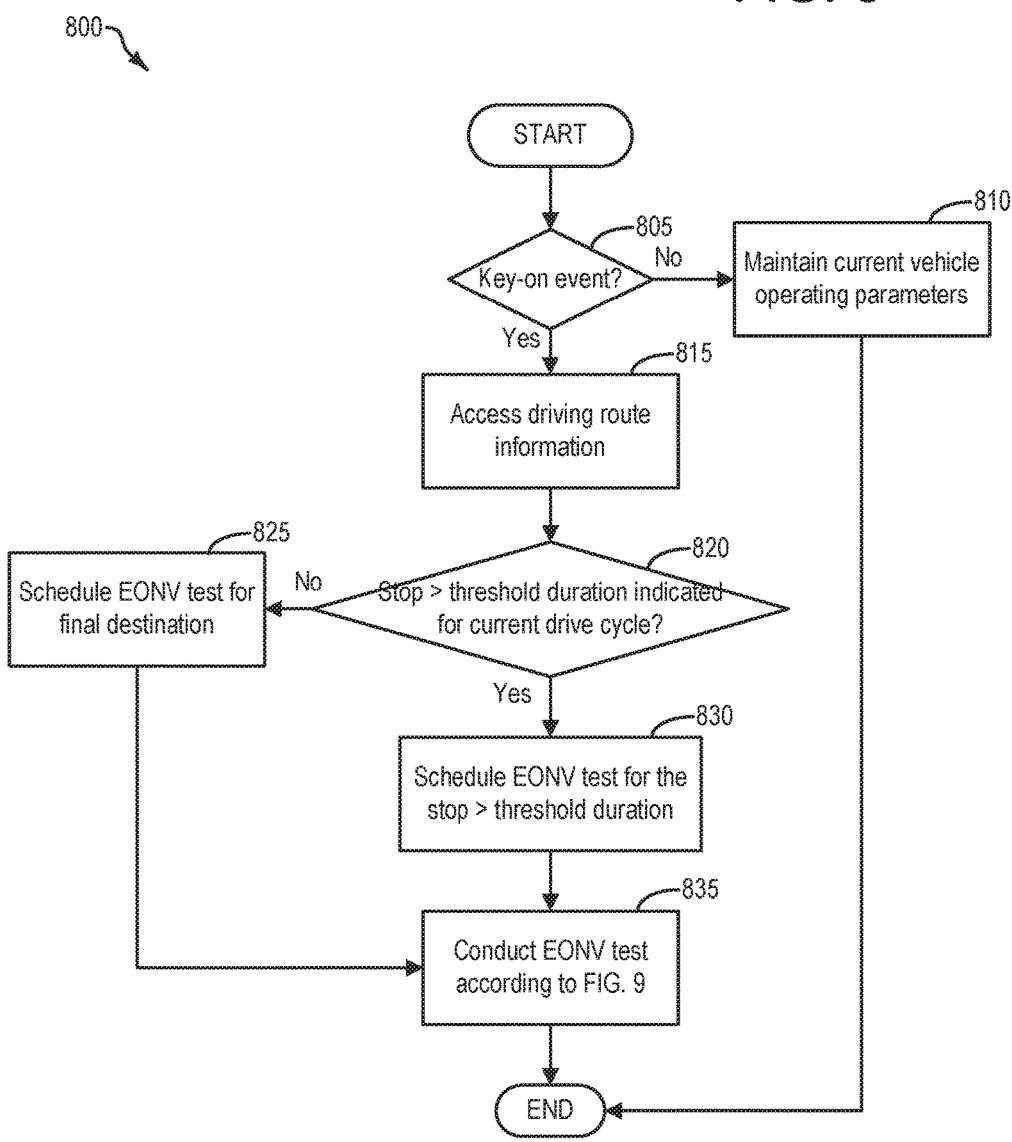
FIG. 8 shows a high level flowchart for an example method for scheduling an engine off natural vacuum (EONV) test responsive to predicted/learned stop(s) greater than a predetermined time duration being indicated for a current driving route.

Turning to FIG. 8, a high level flowchart for an example method 800 for conducting an engine off natural vacuum (EONV) test, is shown. More specifically, an EONV test may be scheduled only for those stops or destination for which a vehicle is predicted/learned to be in a key-off (e.g. vehicle-off) state greater than a predetermined duration (e.g. >45 minutes).

Method 800 will be described with reference to the systems described herein and shown in FIGS. 1-2, though it should be understood that similar methods may be applied to other systems without departing from the scope of this disclosure. Method 800 may be carried out by a controller, such as controller 212 in FIG. 2, and may be stored at the controller as executable instructions in non-transitory memory. Instructions for carrying out method 800 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, canister vent valve (CVV) (e.g. 297), canister purge valve (CPV) (e.g. 261), etc., according to the methods depicted below. In examples where a fuel tank isolation valve (FTIV) (e.g. 252) is included in the vehicle, the controller may control the FTIV as will be discussed below.

Method 800 begins at 805 and may include indicating whether a key-on event is indicated. As discussed above, a key-on event may comprise an ignition key being utilized to start a vehicle either in an engine-on mode, or an electric only mode of operation. In other examples, a key on event may comprise an ignition button on the dash, for example, being depressed. Other examples may include a key-fob starting the vehicle in either an engine-on mode, or an electric-only mode of operation. If, at 805, a key-on event is not indicated, method 800 may proceed to 810, and may include maintaining current vehicle operating parameters. For example, at 510, method 500 may include maintaining a CPV, CVV, engine, etc., in their current conformations and or current modes of operation. Method 800 may then end.

Returning to 805, if a key-on event is indicated, method 800 may proceed to 815. At 815, method 800 may include accessing driving route information. For example, accessing driving route information at 815 may include retrieving learned driving route information from the vehicle controller. More specifically, a particular learned driving route may be indicated to be the same as the current driving route. In other words, the current driving route may be matched with a learned driving route with a high probability. A learned driving route may be matched to the current driving route based on a number of variables, including vehicle location, time of day, date, day of week, trajectory, and/or driver identity. A driver's identity may be input by the driver, or may be inferred based on driving habits, seat position, cabin climate control preferences, voice activated commands, etc. In another example, a vehicle operator may input one or more destinations into an onboard navigation system (e.g. GPS), such that accessing driving route information at 815 may include accessing the vehicle operator inputted driving route information. In some examples, accessing driving route information may include accessing a lookup table, such as lookup table 420 depicted above at FIG. 4B, responsive to a particular driving route being identified with high probability as the current driving route.

Proceeding to 820, method 800 may include indicating whether any predicted/learned stops are indicated for the particular driving route comprising the current drive cycle. More specifically, at 820, method 800 may include indicating whether any predicted/learned stops are greater than a predetermined threshold duration, where the predetermined threshold duration may comprise a time duration of 45 minutes or greater, for example. If, at 820, it is indicated that no predicted/learned stops are likely in the current drive cycle comprising a predicted/learned driving route, method 800 may proceed to 825, and may include scheduling an EONV test for a final destination. In some examples, a final destination may include a home, where the vehicle is parked after being utilized during the day. In other examples, a final destination may include a place of work, etc. In still other examples, a final destination may be programmed into an onboard navigation system, such as a GPS, for example. It may be understood that the final destination may comprise a destination where it is predicted/learned that the vehicle will be stopped for a time duration greater than the predetermined threshold duration.

Alternatively, responsive to one or more stops being predicted to be greater than 45 minutes in duration (e.g. greater than the predetermined threshold duration) during the current drive cycle, then an EONV test may be scheduled for the one or more stops greater than the predetermined threshold duration. In some examples, only one EONV test may be scheduled during a drive cycle where more than one stop is predicted/learned to be greater than the predetermined threshold duration. However, in other examples, multiple EONV tests may be scheduled during a drive cycle responsive to an indication that more than one stop is predicted/learned to be greater than the predetermined threshold duration. In some examples, where more than one stop is indicated to be greater than the predetermined threshold duration, an EONV test may be scheduled for the stop where it is most likely that conditions may be met for conducting the EONV test. For example, because an EONV test is based on an amount of heat rejected from the engine during a drive cycle, the EONV test may be scheduled for a stop where it is most likely that conditions will be met for conducting the EONV test, such as after a period of aggressive driving, where heat rejection to the engine is likely to be high.

Accordingly, responsive to an indication that one or more stops in a current drive cycle are predicted/learned to be greater than the predetermined threshold duration, method 800 may proceed to 830, and may include scheduling the EONV test for the one or more stops greater than the predetermined duration.

Whether the EONV test is scheduled for the final destination, as indicated at step 825, or for one or more stops predicted/learned to be greater than the predetermined duration, as indicated at step 830, method 800 may include conducting the EONV test at 835, according to the method depicted at FIG. 9. Method 800 may then end.

Turning now to FIG. 9, a high level flowchart for an example method 900 for conducting an EONV test, is shown. More specifically, an EONV test may be scheduled for one or more stops during a driving route, where the one or more stops are predicted to be greater than a predetermined threshold duration. Alternatively, responsive to no stops during a driving route being predicted/learned to be greater than the predetermined threshold duration, an EONV test may be conducted at a final destination, as discussed above with regard to method 800 depicted at FIG. 8. However, in either case, an EONV test is carried out in the same fashion, and as such, a method for conducting an EONV test is depicted herein according to method 900. In still other examples, even if one or more stops are predicted to be greater than the predetermined threshold duration, the EONV test may be scheduled for the final destination.

In one example, diagnosing the fuel system and evaporative emissions system based on a learned stop duration may include, responsive to a vehicle-off event corresponding to the learned stop duration comprising a duration greater than a predetermined threshold duration, sealing the fuel system and evaporative emissions system, and indicating the absence of undesired evaporative emissions responsive to a predetermined positive pressure threshold being reached. Under conditions where the positive pressure threshold is not indicated to be reached, the method may include relieving pressure in the fuel system and evaporative emissions system and then re-sealing the fuel system and evaporative emissions system. Subsequently, the method may include indicating the absence of undesired evaporative emissions in the fuel system and evaporative emissions system responsive to a predetermined negative pressure threshold being reached.

Method 900 will be described with reference to the systems described herein and shown in FIGS. 1-2, though it should be understood that similar methods may be applied to other systems without departing from the scope of this disclosure. Method 900 may be carried out by a controller, such as controller 212 in FIG. 2, and may be stored at the controller as executable instructions in non-transitory memory. Instructions for carrying out method 900 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, canister vent valve (CVV) (e.g. 297), canister purge valve (CPV) (e.g. 261), etc., according to the methods depicted below. In examples where a fuel tank isolation valve (FTIV) (e.g. 252) is included in the vehicle, the controller may control the FTIV as will be discussed below.

Method 900 begins at 905 and may include evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 910, method 900 may include indicating whether conditions for conducting an EONV test are indicated to be met. Conditions for conducting an EONV test being met may include a vehicle-off event, which may include an engine-off event, and which may be indicated by other events, such as a key-off event. Conditions for conducting the EONV test may further include an indication that the stop for which the vehicle key-off event coincides is predicted/learned to be greater than a predetermined threshold duration (e.g. greater than 45 minutes), as discussed above with regard to FIG. 8. Conditions being met for the EONV test at 910 may further include a threshold length of engine run time prior to the engine-off event, a threshold amount of fuel in the fuel tank, and a threshold battery state of charge.

In some examples, at 910, conditions being met for conducting an EONV test may include a heat rejection inference (HRI) greater than a HRI threshold. In one example, the HRI may be based on an amount of heat rejected by the engine during the previous drive cycle, the timing of the heat rejected, the length of time spent at differing levels of drive aggressiveness, ambient conditions, etc. The heat rejected by the engine may be inferred based on or more of engine load, fuel injected summed over time, intake manifold air mass summed over time, miles driven, etc. In some examples, the HRI threshold may be a function of ambient temperature and fuel level. For example, for a given ambient temperature, a fuel tank with a higher fill level may require a greater amount of engine run time in order to meet the HRI threshold. More specifically, the HRI threshold may be decreased as fuel level decreases for a given ambient temperature, and increased as fuel level increases for a given ambient temperature.

If, at 910, conditions are not indicated to be met for conducting the EONV test, method 900 may proceed to 915, and may include maintaining current vehicle operating parameters. For example, a CPV, a CVV, and an FTIV (where included), may be maintained in their current configurations. Furthermore, the engine may be maintained in its current operational state responsive to conditions for the EONV test not being indicated to be met. Method 900 may then end.

Returning to 910, responsive to conditions being indicated to be met for the EONV test, method 900 may proceed to 920. At 920, method 900 may include keeping the vehicle controller awake (e.g. maintaining power to the controller) and sealing the fuel system and evaporative emissions system. More specifically, the CVV may be commanded closed in order to seal the fuel system and evaporative emissions system from atmosphere. Furthermore, the CPV may be maintained in a closed conformation (or commanded to a closed conformation) to seal the fuel system and evaporative emissions system from engine intake. Still further, in a case where a FTIV is included in the vehicle, the FTIV may be commanded open to couple the fuel system to the evaporative emissions system.

Proceeding to 925, method 900 may include monitoring fuel system and evaporative emissions system pressure for a duration. Fuel system and evaporative emissions system pressure may be monitored, for example, via a fuel tank pressure transducer (FTPT) (e.g. 291). Proceeding to 930, method 900 may include indicating whether a positive pressure threshold has been reached. Responsive to an indication that the positive pressure threshold has been reached, method 900 may proceed to 935, and may include indicating an absence of undesired evaporative emissions in the fuel system and evaporative emissions system. Such an indication may be stored at the controller, for example.

Responsive to an indication of an absence of undesired evaporative emissions, method 900 may proceed to 940, and may include unsealing the fuel system and evaporative emissions system. For example, at 940, method 900 may include commanding open the CVV. In some examples, where the vehicle includes an FTIV, the FTIV may be kept open responsive to commanding open the CVV, and responsive to pressure in the fuel system and evaporative emissions system reaching atmospheric pressure, the FTIV may be commanded closed.

Proceeding to 945, method 900 may include updating vehicle operating parameters. In a case where an EONV test was conducted, and where no undesired evaporative emissions are indicated, updating vehicle operating parameters at 945 may include maintaining current vehicle operating parameters. For example, a canister purge schedule may be maintained in its current scheduled state. Engine operating parameters may additionally be maintained, etc.

Returning to 930, if the positive pressure threshold is not indicated to be reached, method 900 may proceed to 950. At 950, method 900 may include indicating whether a pressure plateau has been reached. For example, a pressure plateau may include pressure in the fuel system and evaporative emission system reaching a particular pressure that is below the positive pressure threshold, and which does not further continue to rise in the direction of the positive pressure threshold. In some examples, a pressure plateau may be indicated if pressure in the fuel system and evaporative emissions system reaches a level that is below the positive pressure threshold for a predetermined duration. If, at 950, a pressure plateau is not indicated, method 900 may return to 925, and may continue to monitor pressure in the fuel system and evaporative emissions system. Alternatively, at 950, if a pressure plateau is indicated, method 900 may proceed to 955.

At 955, method 900 may include commanding open the CVV, and may further include allowing pressure in the fuel system and evaporative emissions system to stabilize. For example, allowing the fuel system and evaporative emissions system to stabilize may include allowing pressure in the fuel system and evaporative emissions system to reach atmospheric pressure. In a vehicle where a FTIV is included, the FTIV may be maintained open at 955.

Responsive to pressure in the fuel system and evaporative emissions system reaching atmospheric pressure, method 900 may proceed to 960, and may include closing the CVV to once again seal the fuel system and evaporative emissions system from atmosphere and engine intake. Proceeding to 965, method 900 may include monitoring fuel system and evaporative emissions system pressure, similar to that discussed above. At 970, method 900 may include indicating whether a vacuum threshold (e.g. negative pressure threshold with respect to atmospheric pressure) has been reached in the fuel system and evaporative emissions system. Responsive to the vacuum threshold being reached at 970, method 900 may proceed to 935, and may include indicating an absence of undesired evaporative emissions. Proceeding to 940, method 900 may include unsealing the fuel system and evaporative emissions system, such that the fuel system and evaporative emissions system pressure may return to atmospheric pressure. In examples where the vehicle includes an FTIV, the FTIV may be commanded closed responsive to pressure in the fuel system and evaporative emissions system reaching atmospheric pressure.

Proceeding to 945, method 900 may include updating vehicle operating parameters responsive to the indication of an absence of undesired evaporative emissions. As discussed above, in a case where an EONV test was conducted, and where no undesired evaporative emissions are indicated, updating vehicle operating parameters at 945 may include maintaining current vehicle operating parameters. For example, a canister purge schedule may be maintained in its current scheduled state. Engine operating parameters may be maintained, etc.

Returning to 970, responsive to the vacuum threshold not being indicated to be reached, method 900 may proceed to 975, and may include indicating whether a predetermined time duration for conducting the EONV test has expired. As discussed above, such a predetermined time duration may comprise 45 minutes, in some examples. If, at 975, the predetermined time duration for conducting the EONV test is not indicated to have been reached, then method 900 may return to 965, and may include continuing to monitor fuel system and evaporative emissions system pressure.

Alternatively, at 975, responsive to an indication that the EONV time limit has expired, and further responsive to an indication that the vacuum threshold has not been reached, method 900 may proceed to 980, and may include indicating the presence of undesired evaporative emissions. In another example, method 900 may proceed to 980 responsive to pressure in the fuel system and evaporative emissions system stabilizing (e.g. reaching a plateau) for a predetermined time duration without reaching the vacuum threshold. At 980, an indication of undesired evaporative emissions may be stored at the controller, for example. Furthermore, at 980, method 900 may include illuminating a malfunction indicator light (MIL) on the vehicle dash to alert the vehicle operator of the need to service the vehicle.

Proceeding to 940, method 900 may include unsealing the fuel system and evaporative emissions system. As discussed above, unsealing the fuel system and evaporative emissions system may include commanding open the CVV to enable pressure in the fuel system and evaporative emissions system to return to atmospheric pressure. In a vehicle that includes an FTIV, the FTIV may be commanded closed responsive to pressure in the fuel system and evaporative emissions system reaching atmospheric pressure.

Proceeding to 945, method 900 may include updating vehicle operating parameters responsive to the indication of undesired evaporative emissions stemming from the fuel system and/or evaporative emissions system. More specifically, a canister purge schedule may be updated to conduct purging operations more frequently, to reduce an amount of evaporative emissions that may be released to atmosphere. Furthermore, to reduce an amount of undesired evaporative emissions that may escape to atmosphere, the vehicle may be scheduled to operate in an electric mode of operation more frequently (e.g. whenever possible) to minimize undesired evaporative emissions. Method 900 may then end.

Turning to FIG. 10, an example timeline 1000 is shown for conducting an EONV test, according to the methods described herein and with regard to FIGS. 8-9, and as applied to the systems described herein and with reference to FIGS. 1-2. Timeline 1000 includes plot 1005, indicating an on or off status of a vehicle engine, over time. Timeline 1000 further includes plot 1010, indicating whether conditions are met (yes) or not (no) for conducting an EONV test, over time. Timeline 1000 further includes plot 1015, indicating an open or closed status of a canister vent valve (CVV) (e.g. 297), and plot 1020, indicating an open or closed status of a canister purge valve (CPV) (e.g. 261), over time. Timeline 1000 further includes plot 1025, indicating a pressure in a fuel system and evaporative emissions system, over time. Pressure in the fuel system and evaporative emissions system may be monitored via a fuel tank pressure transducer (FTPT) (e.g. 291), and pressure may be either at atmospheric pressure (atm), or either positive (+) or negative (−) with respect to atmospheric pressure. Line 1026 represents a positive pressure threshold which, if reached, may indicate an absence of undesired evaporative emissions. Similarly, line 1027 represents a negative pressure threshold (e.g. vacuum threshold), which, if reached, may indicate an absence of undesired evaporative emissions. Timeline 1000 further includes plot 1030, indicating whether undesired evaporative emissions are indicated in the fuel system and evaporative emissions system, over time.

At time t0, the vehicle is in operation, with the engine combusting fuel, as indicated via plot 1005. As the vehicle is in operation, conditions are not indicated to be met for conducting an EONV test, indicated by plot 1010. The CVV is in an open configuration, and the CPV is closed. Fuel tank pressure is at atmospheric pressure, indicated by plot 1025. In this example timeline, it may be understood that the vehicle system does not include a FTIV. However, where appropriate, the use of an FTIV will be discussed below. Because in this example timeline 1000, a FTIV is not included, when the CVV is open, fuel system and evaporative emissions system pressure may be expected to be near atmospheric pressure. Furthermore, undesired evaporative emissions are not indicated, illustrated by plot 1030.

At time t1, the engine is turned off. While not explicitly illustrated, it may be understood that in this example timeline, the engine being turned off coincides with a key-off event. Furthermore, at time t1, it is indicated that conditions for conducting an EONV test are met. For example, as discussed above, conditions being met may include an indication that the key-off event coincides with a learned/predicted stop along a learned/predicted driving route, where the learned/predicted stop is indicated to be greater than a predetermined threshold duration (e.g. greater than 45 minutes). Furthermore, as discussed above, conditions being met for conducting the EONV test may include a threshold length of engine run time being met prior to the engine-off event, a threshold amount of fuel in the fuel tank, a threshold battery charge, a heat rejection inference greater than a heat rejection inference threshold, a threshold level of intake manifold vacuum, etc.

With conditions for the EONV test being met at time t1, the CVV is commanded closed to seal the fuel system and evaporative emissions system. While not explicitly illustrated, it may be understood that the vehicle controller may be kept awake to conduct the EONV test. In a case where the vehicle includes an FTIV, the FTIV may be commanded open to couple the fuel system to the evaporative emissions system. Furthermore, the CPV may be maintained closed (or commanded closed), responsive to conditions being met for conducting the EONV test.

With the fuel system and evaporative emissions system sealed from atmosphere and from engine intake, pressure in the fuel system and evaporative emissions system rises between time t1 and t2, as indicated by plot 1025. However, the pressure rise plateaus between time t1 and t2, without reaching the predetermined positive pressure threshold, represented by line 1026. Accordingly, at time t2, the CVV is commanded open to relieve pressure in the fuel system an evaporative emissions system. Thus, between time t2 and t3, with the CVV open, pressure in the fuel system and evaporative emissions system returns to atmospheric pressure, indicated by plot 1025. For vehicle that include an FTIV, the FTIV may be maintained open between time t2 and t3.

At time t3, with pressure in the fuel system and evaporative emissions system returned to atmospheric pressure, the fuel system and evaporative emissions system may again be sealed by commanding closed the CVV. It may be understood that the CPV may be maintained closed, and the FTIV, where included, may be maintained open. With the fuel system and evaporative emissions system sealed from atmosphere and from engine intake, vacuum builds in the fuel system and evaporative emissions system. Between time t3 and t4, vacuum builds, but does not reach the negative pressure threshold (e.g. vacuum threshold), represented by line 1027. It may be understood, that at time t4, the predetermined time duration for conducting the EONV test elapses, or expires, thus completing the EONV test. Because the negative pressure threshold was not reached during the vacuum-build phase of the EONV test, undesired evaporative emissions are indicated at time t4. Such an indication may be stored at the controller, for example, as discussed above, and a MIL may be illuminated indicating to the vehicle operator of the need to service the vehicle.

At time t4, with undesired evaporative emissions indicated, conditions are no longer indicated to be met for conducting the EONV test, indicated by plot 1010. Furthermore, the CVV is commanded open, to relieve fuel system and evaporative emissions system pressure. In a case where an FTIV is included in the vehicle, the FTIV may be commanded closed responsive to pressure in the fuel system and evaporative emissions system reaching atmospheric pressure. Accordingly, with the CVV commanded open, pressure in the fuel system and evaporative emissions system returns to atmospheric pressure between time t4 and t5.

Figure 11:
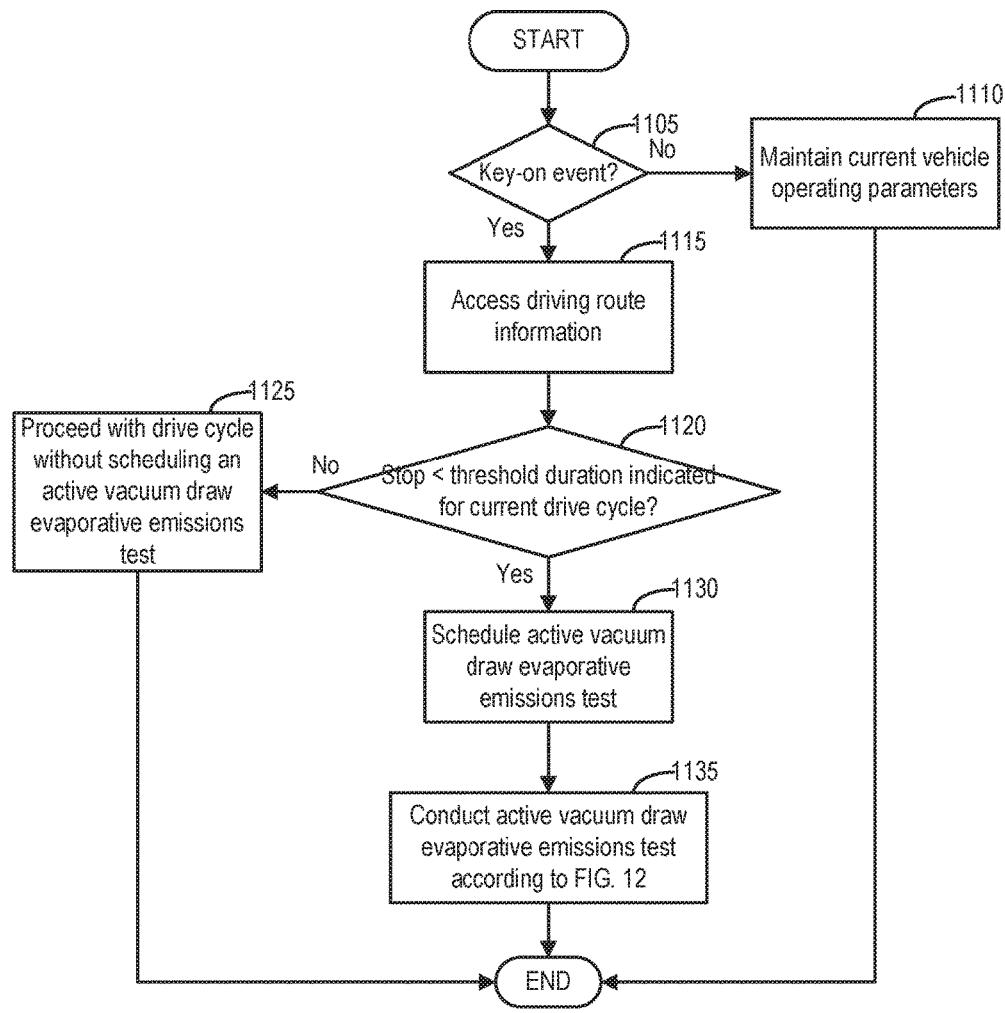
FIG. 11 shows a high level flowchart for an example method for conducting an active vacuum draw evaporative emissions test responsive to predicted/learned stop(s) less than a predetermined time duration being indicated for a current driving route.

Turning to FIG. 11, a high level flowchart for an example method 1100 for conducting an active vacuum draw evaporative emissions test, is shown. More specifically, an active vacuum draw evaporative emissions test may be scheduled only for learned/predicted stops during a learned/predicted drive cycle where the learned/predicted stops are expected to be less than a predetermined duration (e.g. less than 45 minutes).

Method 1100 will be described with reference to the systems described herein and shown in FIGS. 1-2, though it should be understood that similar methods may be applied to other systems without departing from the scope of this disclosure. Method 1100 may be carried out by a controller, such as controller 212 in FIG. 2, and may be stored at the controller as executable instructions in non-transitory memory. Instructions for carrying out method 1100 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, canister vent valve (CVV) (e.g. 297), canister purge valve (CPV) (e.g. 261), etc., according to the methods depicted below. In examples where a fuel tank isolation valve (FTIV) (e.g. 252) is included in the vehicle, the controller may control the FTIV as will be discussed below.

Method 1100 begins at 1105 and may include indicating whether a key-on event is indicated. As discussed above, a key-on event may comprise an ignition key being utilized to start a vehicle either in an engine-on mode, or an electric only mode of operation. In other examples, a key on event may comprise an ignition button on the dash, for example, being depressed. Other examples may include a key-fob starting the vehicle in either an engine-on mode, or an electric-only mode of operation. If, at 1105, a key-on event is not indicated, method 1100 may proceed to 1110, and may include maintaining current vehicle operating parameters. For example, at 1110, method 1100 may include maintaining a CPV, CVV, engine, etc., in their current conformations and or current modes of operation. Method 1100 may then end.

Returning to 1105, if a key-on event is indicated, method 1100 may proceed to 1115. At 1115, method 1100 may include accessing driving route information. For example, accessing driving route information at 1115 may include retrieving learned driving route information from the vehicle controller. More specifically, a particular learned driving route may be indicated to be the same as the current driving route. In other words, the current driving route may be matched with a learned driving route with a high probability. A learned driving route may be matched to the current driving route based on a number of variables, including vehicle location, time of day, date, day of week, trajectory, and/or driver identity. A driver's identity may be input by the driver, or may be inferred based on driving habits, seat position, cabin climate control preferences, voice activated commands, etc. In another example, a vehicle operator may input one or more destinations into an onboard navigation system (e.g. GPS), such that accessing driving route information at 1115 may include accessing the vehicle operator inputted driving route information. In some examples, accessing driving route information may include accessing a lookup table, such as lookup table 420 depicted above at FIG. 4B, responsive to a particular driving route being identified with high probability as the current driving route.

Proceeding to 1120, method 1100 may include indicating whether any predicted/learned stops are indicated for the particular driving route comprising the current drive cycle. More specifically, at 1120, method 1100 may include indicating whether any predicted/learned stops are expected to be less than a predetermined threshold duration, where the predetermined threshold duration may comprise a time duration of less than 45 minutes, for example. If, at 1120, it is indicated that no predicted/learned stops expected to be less than the predetermined threshold duration are indicated, method 1100 may proceed to 1125, and may include proceeding with the drive cycle without scheduling an active vacuum draw evaporative emissions test. Method 1100 may then end. However, it may be understood that in some examples, an active draw evaporative emissions test may be scheduled for a final destination stop which may comprise a stop predicted/learned to be greater than 45 minutes, as will be discussed in greater detail below.

Returning to 1120, responsive to one or more predicted/learned stops comprising stops expected to be less than the predetermined time duration, method 1100 may proceed to 1130, and may include scheduling an active vacuum draw evaporative emissions test for one or more of the predicted/learned stops. In some examples where more than one predicted/learned stop is indicated to be less than the predetermined time duration for the current drive cycle, more than one active draw evaporative emissions test may be scheduled for the more than one predicted/learned stop. Alternatively, in other examples, only one active draw evaporative emissions test may be scheduled for one of the one or more predicted/learned stops during the current drive cycle.

Responsive to scheduling the one or more active draw evaporative emissions tests, method 1100 may proceed to 1135, and may include conducting the active vacuum draw evaporative emissions test according to the method depicted at FIG. 12. Briefly, the active vacuum draw evaporative emissions test may include actively reducing pressure in the fuel system and evaporative emissions system, and may further comprise communicating vacuum from an engine intake manifold to the fuel system and evaporative emissions system, under conditions where the fuel system and evaporative emissions system are sealed from atmosphere. Method 1100 may then end.

Turning now to FIG. 12, a high level flowchart for an example method 1200 for conducting an active draw evaporative emissions test, is shown. More specifically, an active draw evaporative emissions test may be scheduled for one or more stops during a driving route, where the one or more stops are predicted to be less than a predetermined threshold duration. Alternatively, responsive to no stops during a driving route being predicted/learned to be less than the predetermined duration, the active draw evaporative emissions test may be conducted in some examples at a final destination, or in some examples, not conducted for a particular driving route. In any case, the method for conducting an active draw evaporative emissions test is the same regardless of whether the active draw evaporative emissions test is conducted at a stop along a driving route, or at a final destination of a driving route, and thus, a method for conducting the active draw evaporative emissions test is depicted herein according to method 1200.

Method 1200 will be described with reference to the systems described herein and shown in FIGS. 1-2, though it should be understood that similar methods may be applied to other systems without departing from the scope of this disclosure. Method 1200 may be carried out by a controller, such as controller 212 in FIG. 2, and may be stored at the controller as executable instructions in non-transitory memory. Instructions for carrying out method 1200 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, canister vent valve (CVV) (e.g. 297), canister purge valve (CPV) (e.g. 261), etc., according to the methods depicted below. In examples where a fuel tank isolation valve (FTIV) (e.g. 252) is included in the vehicle, the controller may control the FTIV as will be discussed below.

Method 1200 begins at 1205, and may include indicating whether conditions are met for an active draw evaporative emissions test. For example, conditions being met for an active draw evaporative emissions test at 1205 may include an indication that the vehicle is within a predetermined threshold timeframe from arriving at a learned/predicted stop, where the learned/predicted stop may comprise a stop expected to be of a duration less than a predetermined duration (e.g. less than 45 minutes). Such an indication may be provided to a vehicle controller (e.g. 212) via an onboard navigation system (GPS), via learned driving routes stored at the controller in the form of lookup tables, etc. Conditions being met for conducting the active draw evaporative emissions test may further include an indication that the engine is in operation. In some examples, if all conditions are met for conducting an active draw evaporative emissions test, but where the engine is not on, the engine may be pulled up (e.g. activated, turned on) such that the active draw evaporative emissions test may be conducted.

If, at 1205, conditions are not indicated to be met for conducting the active draw evaporative emissions test, method 1200 may proceed to 1210, and may include maintaining current vehicle operating parameters. For example, maintaining current vehicle operating parameters may include maintaining the CPV, CVV, and FTIV (where included), in their current operational states. Furthermore, maintaining current vehicle operating parameters may include maintaining an engine status in its current operational status, for example. Method 1200 may then end.

Alternatively, responsive to conditions being met for conducting the active draw evaporative emissions test at 1205, method 1200 may proceed to 1215. At 1215, method 1200 may include commanding closed the CVV to seal the fuel system and evaporative emissions system from atmosphere. In some examples where the vehicle includes an FTIV, the FTIV may be commanded open to relieve fuel system pressure, prior to commanding closed the CVV. Responsive to sealing the fuel system and evaporative emissions system from atmosphere at 1215 by commanding closed the CVV, method 1200 may proceed to 1220. At 1220, method 1200 may include duty cycling the CPV in order to communicate engine intake manifold vacuum to the fuel system and evaporative emissions system. The CPV may be cycled at a predetermined duty cycle, for example. While duty cycling the CPV, pressure in the fuel system and evaporative emissions system may be monitored, for example, via a fuel tank pressure transducer (FTPT) (e.g. 291). For example, the CPV may be duty cycled such that a predetermined target vacuum may be established in the fuel system and evaporative emissions system. In some examples the target vacuum may comprise a vacuum of −8 InH2O, for example, however the target vacuum may be greater than, or less than −8 InH2O, in other examples. Accordingly, proceeding to 1225, method 1200 may include indicating whether the target vacuum has been reached. Responsive to an indication that the target vacuum has not been reached, method 1200 may return to 1220, and may include continuing to duty cycle the CPV. As an example, the duty cycle of the CPV may initially be commanded to 100%, which may comprise the CPV being commanded to an open state in order to rapidly achieve the target vacuum in the fuel system and evaporative emissions system.

At 1225, responsive to an indication that the target vacuum has been reached, method 1200 may proceed to 1230, and may include duty cycling the CPV to maintain the fuel system and evaporative emissions system pressure at the target vacuum. More specifically, the duty cycle may be decreased such that the target vacuum is maintained, without excess vacuum building over the target vacuum.

Proceeding to 1235, method 1200 may include indicating whether a key-off event (e.g. vehicle-off event) has occurred. Such an event may be communicated to the controller, for example. If, at 1235, a key-off event is not indicated, method 1200 may return to 1230 and may include continuing to duty cycle the CPV to maintain the target vacuum. Duty cycling the CPV to maintain the target vacuum may include increasing the duty cycle responsive to pressure in the fuel system and evaporative emissions system rising (e.g. becoming more positive with respect to the target vacuum), or may include decreasing the duty cycle responsive to pressure in the fuel system and evaporative emissions system falling (e.g. becoming more negative with respect to the target vacuum). In this way, the target vacuum may be maintained until a key-off event is indicated. In some strategies, however, the duty cycling may be altered to prevent an undesired excursion in engine combustion air-fuel ratio.

Responsive to a key-off event being indicated at 1235, method 1200 may proceed to 1240. At 1240, method 1200 may include sealing the fuel system and evaporative emissions system by closing the CPV. While not explicitly illustrated, it may be understood that at 1240, the CVV may be maintained in a closed configuration. Furthermore, while not explicitly illustrated, it may be understood that the vehicle controller may be maintained awake to proceed with the conducting of the test.

Proceeding to 1245, method 1200 may include monitoring fuel system and evaporative emissions system pressure for a predetermined duration. More specifically, a pressure bleed-up in the fuel system and evaporative emissions system may be monitored, and compared to a pressure bleed-up threshold, or a pressure bleed-up rate threshold. For example, the pressure bleed-up threshold may comprise a pressure which, if reached while the fuel system and evaporative emissions system is sealed, may indicate the presence of undesired evaporative emissions. In other examples, a monitored pressure bleed-up rate may be compared to a pressure bleed-up rate threshold, and if the monitored pressure bleed-up rate is faster than the pressure bleed-up rate threshold, then undesired evaporative emissions may be indicated. Both the pressure bleed-up threshold and/or pressure bleed-up rate threshold may be adjusted as a function of fuel level and ambient temperature. In some examples, both the pressure bleed-up threshold and/or pressure bleed-up rate threshold may be additionally or alternatively adjusted as a function of BP and estimated fuel temperature.

Accordingly, proceeding to 1250, method 1200 may include indicating whether a pressure bleed-up is greater than the predetermined pressure bleed-up threshold, or in some examples, whether a pressure bleed-up rate is greater than a predetermined pressure bleed-up rate threshold. Responsive to the pressure bleed-up not reaching or exceeding the pressure bleed-up threshold, or responsive to the rate of pressure bleed-up being less than the predetermined pressure bleed-up rate threshold, method 1200 may proceed to 1255. At 1255, method 1200 may include indicating the absence of undesired evaporative emissions in the fuel system and evaporative emissions system. Such an indication may be stored at the controller, for example.

Responsive to an indication of an absence of undesired evaporative emissions in the fuel system and evaporative emissions system, method 1200 may proceed to 1260, and may include unsealing the fuel system and evaporative emissions system. Unsealing the fuel system and evaporative emissions system at 1260 may include commanding open the CVV, for example. In a case where the vehicle includes an FTIV, the FTIV may be maintained open until pressure in the fuel system and evaporative emissions system reaches atmospheric pressure, and may then be commanded closed.

Proceeding to 1265, method 1200 may include updating vehicle operating parameters. Responsive to an indication of an absence of undesired evaporative emissions in the fuel system and evaporative emissions system, updating vehicle operating parameters at 1260 may include maintaining current vehicle operating parameters. For example, a purging schedule may be maintained in its current schedule, and engine operational status, etc., may be maintained. Method 1200 may then end.

Returning to 1250, responsive to an indication that pressure in the fuel system and evaporative emissions system has reached the predetermined pressure bleed-up threshold, or responsive to an indication that a pressure bleed-up rate is greater than the predetermined pressure bleed-up rate threshold, method 1200 may proceed to 1270, and may include indicating the presence of undesired evaporative emissions stemming from the fuel system and/or evaporative emissions system. Such an indication may be stored at the controller, for example. Furthermore, a MIL may be illuminated on the vehicle dash, alerting the vehicle operator of the need to service the vehicle.

Proceeding to 1260, method 1200 may include unsealing the fuel system and evaporative emissions system. As discussed above, unsealing the fuel system and evaporative emissions system may include commanding open the CVV to relieve pressure in the fuel system and evaporative emissions system. Furthermore, in a case where the vehicle includes and FTIV, the FTIV may be maintained open until an indication that pressure in the fuel system and evaporative emissions system has reached atmospheric pressure, at which point the FTIV may be commanded closed.

Proceeding to 1265, method 1200 may include updating vehicle operating parameters responsive to the indication of undesired evaporative emissions. For example, a canister purge schedule may be updated such that purging operations are conducted more frequently, to limit an amount of undesired evaporative emissions that may otherwise escape to atmosphere. In another example, the controller may update vehicle operating parameters such that the vehicle is propelled via an electric mode of operation whenever possible, to reduce or avoid undesired evaporative emissions being released to atmosphere. Method 1200 may then end.

Turning to FIG. 13, an example timeline 1300 is shown for conducting an active draw evaporative emissions test, according to the methods depicted herein and with reference to FIGS. 11-12, and as applied to the systems depicted herein and with reference to FIGS. 1-2. Timeline 1300 includes plot 1305, indicating an on or off status of a vehicle engine, over time. Timeline 1300 further includes plot 1310, indicating whether conditions are met (yes) or not (no) for an active draw evaporative emissions test. Timeline 1300 further includes plot 1315, indicating an open or closed status of a canister vent valve (CVV) (e.g. 297), and plot 1320, indicating an open or closed status of a canister purge valve (CPV) (e.g. 261), over time. Timeline 1300 further includes plot 1325, indicating a fuel system and evaporative emissions system pressure, over time. Pressure in the fuel system may be monitored via a fuel tank pressure transducer (FTPT) (e.g. 291), and pressure may be at atmospheric pressure (atm), or either positive (+) or negative (−) with respect to atmospheric pressure. Line 1326 represents a target vacuum threshold, where the target is a desired vacuum level in the fuel system and evaporative emissions system responsive to conditions being met for conducting the active draw evaporative emissions test. Line 1327 represents a predetermined bleed-up pressure threshold, which, if reached during the active draw evaporative emissions test, may indicate the presence of undesired evaporative emissions. Timeline 1300 further includes plot 1330, indicating whether undesired evaporative emissions are indicated in the fuel system and/or evaporative emissions system, over time.

At time t0, the vehicle is in operation, with the engine combusting fuel to propel the vehicle, indicated by plot 1305. However, conditions are not yet indicated to be met for an active draw evaporative emissions test, indicated by plot 1310. The CVV is in an open configuration, and the CPV is in a closed configuration. With the CVV open and the CPV closed, pressure in the fuel system and evaporative emissions system is near atmospheric pressure, indicated by plot 1325. Accordingly, it may be understood that the vehicle in this example timeline is not equipped with a fuel tank isolation valve (FTIV) (e.g. 252). However, where appropriate, use of an FTIV will be discussed in accordance with example timeline 1300. Furthermore, undesired evaporative emissions are not indicated, illustrated by plot 1330.

At time t1, conditions are indicated to be met for conducting an active draw evaporative emissions test. As discussed above, conditions being met for an active draw evaporative emissions test may include an indication that the vehicle is within a predetermined threshold timeframe from arriving at a learned/predicted stop, where the learned/predicted stop may comprise a stop expected to be of a duration less than a predetermined duration (e.g. less than 45 minutes). Such an indication may be provided to the vehicle controller (e.g. 212) via an onboard navigation system (e.g. GPS), via learned driving routes stored at the controller in the form of lookup tables, etc. Conditions being met may further include an indication that the engine is in operation.

As conditions are indicated to be met for conducting the active draw evaporative emissions test at time t1, the CVV is commanded closed, indicated by plot 1315. Furthermore, the CPV is commanded open, in order to communicate engine intake manifold vacuum to the fuel system and evaporative emissions system. In a case where the vehicle includes an FTIV, the FTIV may be commanded open at time t1, such that the fuel system and evaporative emissions system may be fluidically coupled to one another.

With the CPV commanded open (e.g. duty cycled at 100% duty cycle) such that intake manifold vacuum may be communicated to the fuel system and evaporative emissions system, and where the fuel system and evaporative emission system is sealed from atmosphere via the CVV in a closed configuration, vacuum may build in the fuel system and evaporative emissions system. Accordingly, between time t1 and t2, pressure in the fuel system and evaporative emissions system becomes more negative with respect to atmospheric pressure. At time t2, the target vacuum threshold is indicated to be reached, represented by line 1326. However, the vehicle has not yet reached the predicted/learned destination, and as such, the target vacuum may be maintained until it is indicated that the vehicle has arrived at the predicted/learned destination. Accordingly, between time t2 and t3, the CPV is duty cycled at a rate less than 100% duty cycle, such that the negative pressure in the fuel system and evaporative emissions system is maintained at the target vacuum.

At time t3, the engine is indicated to be turned off. In this example timeline, it may be understood that the engine-off event at time t3 corresponds to a key-off event, in which the engine is deactivated. Accordingly, it may be indicated to the controller that the vehicle has reached the predicted/learned destination. As such, at time t3, the CPV is commanded closed, and the CVV is maintained closed. For a vehicle equipped with an FTIV, it may be understood that the FTIV may be maintained open at time t3. With the engine off, the CPV closed, and the CVV closed, the target vacuum may be understood to be trapped in the fuel system and evaporative emissions system. As discussed above, responsive to the target vacuum being established in the fuel system and evaporative emissions system, pressure bleed-up (or in some examples, pressure bleed-up rate) may be monitored in the fuel system and evaporative emissions system, such that it may be determined as to the presence or absence of undesired evaporative emissions in the fuel system and evaporative emissions system.

Thus, between time t3 and t4, pressure in the fuel system and evaporative emissions system may be monitored, for example, via the FTPT. At time t4, pressure in the fuel system reaches the predetermined bleed-up pressure threshold, represented by line 1327. As the pressure in the fuel system and evaporative emissions system reached the predetermined bleed-up pressure threshold, undesired evaporative emissions are indicated, illustrated by plot 1330. Such an indication may be stored at the controller, for example. Furthermore, a MIL may be illuminated on the vehicle dash, alerting the vehicle operator of the need to service the vehicle. With undesired evaporative emissions indicated in the vehicle fuel system and/or evaporative emissions system, conditions for an active draw evaporative emissions test are no longer indicated to be met, illustrated by plot 1310. Furthermore, the CVV is commanded open, to relieve pressure in the fuel system and evaporative emissions system. In the case where the vehicle includes an FTIV, the FTIV may be commanded closed responsive to pressure in the fuel system and evaporative emissions system reaching atmospheric pressure. With the CVV open, pressure in the fuel system and evaporative emissions system returns to atmospheric pressure between time t4 and t5.

While the above descriptions have discussed methods for scheduling and conducting tests for undesired evaporative emissions based on predicted/learned hill segments, predicted/learned stop duration, and predicted/learned final destinations, such descriptions have been discussed in isolation from one another. However, in some examples, for a particular drive cycle, an optimized evaporative emissions test schedule may be generated, based on a combination of information pertaining to predicted/learned hill segments, predicted/learned stop duration, and predicted/learned final destination. For example, a BP change evaporative emissions test may in some examples be scheduled for a drive route based on a predicted/learned hill segment, and an EONV test may be scheduled for a final destination of the same drive route. In other examples, an active draw evaporative emissions test may be scheduled for a stop less than a predetermined time duration (e.g. less than 45 minutes) during a drive route, and an EONV test may be scheduled for the final destination of the same drive route. Such examples are meant to be illustrative, and not limiting. For example, any combination of conducting BP change evaporative emissions test(s), active draw test(s), and EONV test(s) may be utilized based on predicted/learned driving route information.

Furthermore, in some examples, variables such as ambient temperature, local weather conditions, predicted/learned heat rejection during a predicted/learned drive cycle, fuel level, etc., may be taken into account when generating an optimized evaporative emissions test schedule for a particular driving route. Such examples will be discussed in further detail below.

Figure 14:
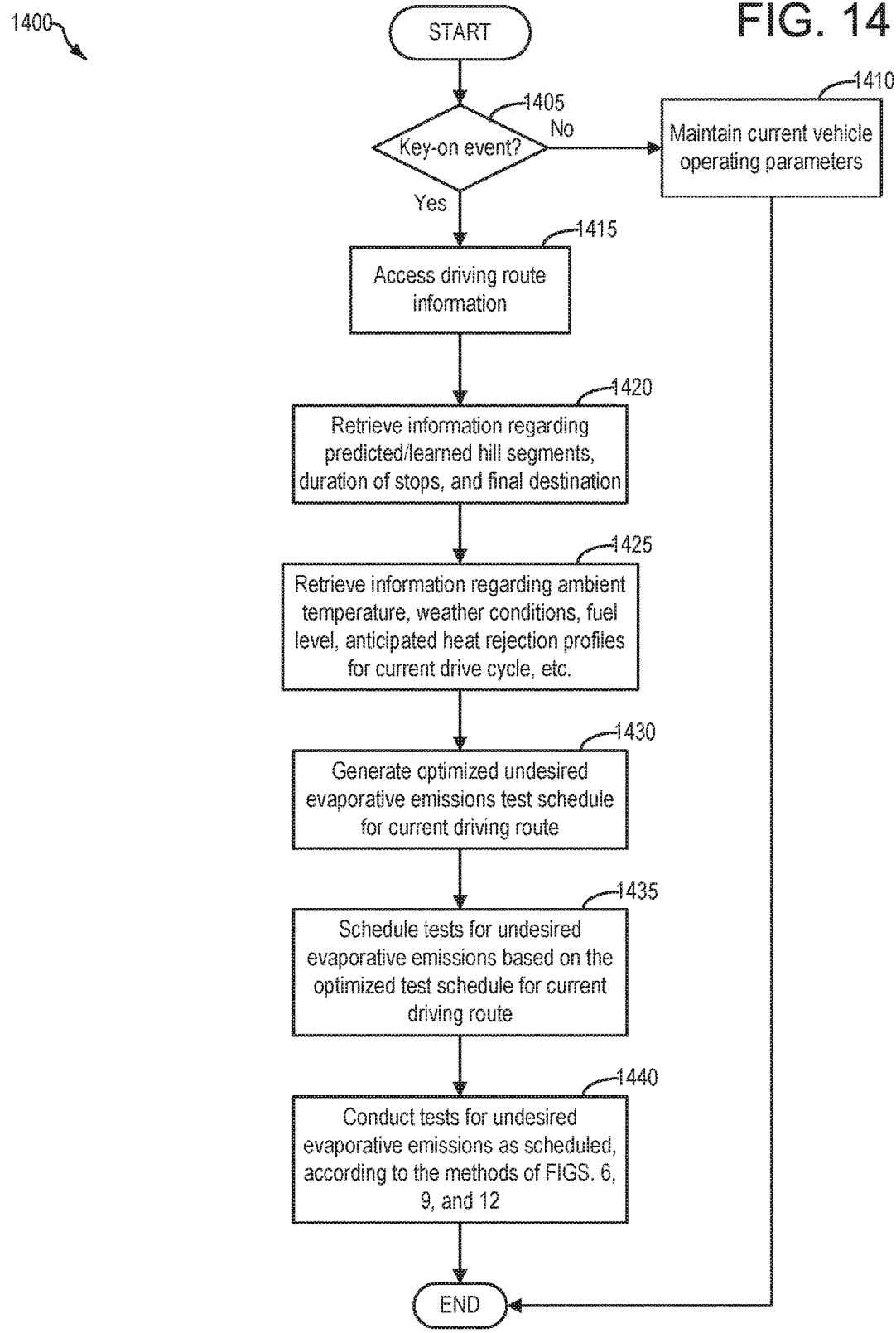
FIG. 14 shows a high level flowchart for generating an optimized schedule for conducting evaporative emissions test diagnostic routines as a function of learned travel routes.

Turning to FIG. 14, an example method 1400 for generating an optimized evaporative emissions test schedule for a predicted/learned driving route, is shown. More specifically, a vehicle controller may retrieve information regarding learned driving route information, and may schedule one or more tests for undesired evaporative emissions during the predicted/learned driving route, such that an appropriate test for undesired evaporative emissions may be conducted at appropriate timepoints/locations with regard to a given learned drive routine. In some examples, as will be discussed below, scheduling of the one or more tests for undesired evaporative emissions may further be based on indicated ambient temperature, local weather conditions, fuel level, expected heat rejection profiles during the current drive cycle, etc., as will be discussed in detail below.

Method 1400 will be described with reference to the systems described herein and shown in FIGS. 1-2, though it should be understood that similar methods may be applied to other systems without departing from the scope of this disclosure. Method 1400 may be carried out by a controller, such as controller 212 in FIG. 2, and may be stored at the controller as executable instructions in non-transitory memory. Instructions for carrying out method 1400 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, canister vent valve (CVV) (e.g. 297), canister purge valve (CPV) (e.g. 261), etc., according to the methods depicted below. In examples where a fuel tank isolation valve (FTIV) (e.g. 252) is included in the vehicle, the controller may control the FTIV as discussed above.

Method 1400 begins at 1405 and may include indicating whether a key-on event is indicated. As discussed above, a key-on event may comprise an ignition key being utilized to start a vehicle either in an engine-on mode, or an electric only mode of operation. In other examples, a key on event may comprise an ignition button on the dash, for example, being depressed. Other examples may include a key-fob starting the vehicle in either an engine-on mode, or an electric-only mode of operation. If, at 1405, a key-on event is not indicated, method 1400 may proceed to 1410, and may include maintaining current vehicle operating parameters. For example, at 1410, method 1400 may include maintaining a CPV, CVV, engine, etc., in their current conformations and or current modes of operation. Method 1400 may then end.

Returning to 1405, if a key-on event is indicated, method 1400 may proceed to 1415. At 1415, method 1400 may include accessing driving route information. For example, accessing driving route information at 1415 may include retrieving learned driving route information from the vehicle controller. More specifically, a particular learned driving route may be indicated to be the same as the current driving route. In other words, the current driving route may be matched with a learned driving route with a high probability. A learned driving route may be matched to the current driving route based on a number of variables, including vehicle location, time of day, date, day of week, trajectory, and/or driver identity. A driver's identity may be input by the driver, or may be inferred based on driving habits, seat position, cabin climate control preferences, voice activated commands, etc. In another example, a vehicle operator may input one or more destinations into an onboard navigation system (e.g. GPS), such that accessing driving route information at 1415 may include accessing the vehicle operator inputted driving route information. In some examples, accessing driving route information may include accessing a lookup table, such as lookup table 420 depicted above at FIG. 4B, responsive to a particular driving route being identified with high probability as the current driving route.

Proceeding to 1420, method 1400 may include retrieving information regarding predicted/learned hill segments, duration of predicted/learned stops, and predicted/learned final destination. More specifically, at 1420, method 1400 may include indicating whether any segments of the current drive cycle contain altitude changes in which a pressure change yield may be greater than a predetermined pressure change yield threshold for a sealed fuel system and evaporative emissions system, as discussed above with regard to FIG. 5. Furthermore, at 1420, method 1400 may include indicating whether any predicted/learned stops are indicated for the particular driving route comprising the current drive cycle. For example, at 1420, method 1400 may include indicating whether any predicted/learned stops are greater than a predetermined threshold duration (e.g. greater than 45 minutes), as discussed above with regard to FIG. 8. Still further, at 1420, method 1400 may include indicating whether any predicted/learned stops for the current drive cycle are predicted/learned to be less than a predetermined threshold duration (e.g. less than 45 minutes), as discussed above with regard to FIG. 11.

Proceeding to 1425, method 1400 may include retrieving information regarding ambient temperature, as indicated for example, via an ambient temperature sensor. At 1425, method 1400 may further include retrieving information regarding local weather conditions. As an example, local weather conditions may be communicated to the controller via the onboard navigation system (e.g. GPS), via wireless communication via the internet, or any other conventional means of communicating local weather conditions to the vehicle controller. For example, ambient temperature and local weather conditions (e.g. wind, rain, snow, etc.) may be taken into account when the controller may make determinations as to whether to conduct an EONV test, or an active draw evaporative emissions test, as will be discussed in further detail below. Still further, at 1425, method 1400 may include indicating a fuel level via, for example, a fuel level sensor (e.g. 234). For example, knowledge of a fuel level may be utilized for predicting heat rejection profiles for particular segments of a predicted/learned driving routine. As an example, a heat rejection inference (HRI) threshold for determining whether to conduct an EONV test at a particular stop may be adjusted as a function of predicted fuel level. For example, based on a current indicated fuel level and a predicted/learned driving route, it may be inferred as to a level of fuel in the tank at a particular predicted/learned stop. Such information may be utilized to predict whether an HRI may be above an HRI threshold at a particular predicted/learned stop, and such information may be utilized in order to determine whether to schedule/conduct an EONV test as compared to an active draw evaporative emissions test.

Proceeding to 1430, method 1400 may include generating an optimized undesired evaporative emissions test schedule for the current predicted/learned driving route. For example, the vehicle controller may process stored data comprising a number of predicted/learned hill segments conducive to conducting a BP change evaporative emissions test, a number of predicted/learned stops with duration(s) greater than a predetermined threshold duration (e.g. >45 minutes), and a number of predicted/learned stops with duration(s) less than the predetermined threshold duration (e.g. <45 minutes). The vehicle may further process data comprising ambient temperature, fuel level, local weather conditions, predicted heat rejection profiles, etc. Based on such a combination of data, method 1400 may generate an optimized undesired evaporative emissions test schedule for the current predicted/learned driving route.

Examples of an optimized undesired evaporative emissions test schedule will be discussed herein. It may be understood that such examples are meant to be illustrative, and that examples within the scope of this disclosure that are not specifically discussed may be carried out according to the methods depicted herein without departing from the scope of the present disclosure.

In one example, consider two stops that are predicted to be of a duration greater than the predetermined threshold (e.g. >45 minutes). While an EONV test may be scheduled for both stops, as the test is likely to be completed, one stop may be preferential to another based on an amount of heat rejection (e.g. heat rejection profile) expected (e.g. learned) at each of the predicted/learned stops. For example, prior to one stop, learned driving route information may indicate that the vehicle typically is operated in a low-level of aggressiveness, low load, etc. As such, heat rejection may be predicted to be below an HRI threshold at such a stop. In some examples, fuel level, weather conditions, ambient temperature, etc., may be further utilized in order to generate an accurate prediction of a heat rejection profile for such a stop. If the predicted heat rejection profile is indicated to be lower than an HRI threshold, then an EONV test may not be scheduled for that stop. Instead, an active draw evaporative emissions test may be scheduled for that particular stop, such that the likelihood of the test providing robust results may be higher for an active draw evaporative emissions test. In other examples, responsive to the predicted heat rejection profile being less than an HRI threshold, no test for undesired evaporative emissions may be scheduled for that particular stop. Alternatively, for an example stop where heat rejection is predicted to be higher than an HRI threshold for that particular stop, an EONV test may be scheduled, instead of an active draw evaporative emissions test.

Similar logic may be applied to a final destination stop. For example, in some examples it may be predicted (based on the variables discussed above including ambient temperature, weather conditions, fuel level, learned driving habits, etc.) that heat rejection may be below an HRI threshold responsive to the final destination being reached. In such an example, an active draw evaporative emissions test may be scheduled for the final destination, rather than an EONV test. In other examples, where heat rejection may be predicted to be above an HRI threshold for a predicted/learned final destination, an EONV test may be conducted, instead of an active draw evaporative emissions test.

With regard to tests for undesired evaporative emissions during hill segments, where predicted vacuum/pressure yields for a sealed fuel system and evaporative emissions system are indicated to be greater than a predetermined pressure change yield threshold, tests may be only scheduled for those hill segments where it is further indicated that subsequent to the hill segment, a predetermined duration or length of vehicle travel is predicted/learned to be substantially flat. In other words, if responsive to completion of a particular hill segment, another hill segment is rapidly encountered by the vehicle, then the subsequent change in BP due to the subsequent hill may impact interpretation of the results of a bleed-up or bleed-down pressure analysis. Accordingly, at 1430, generating an optimized undesired evaporative emissions test schedule may include excluding hill segments where a test may be conducted, responsive to another hill segment rapidly following the particular hill segment.

In some examples, more than one test for undesired evaporative emissions may be scheduled for a particular predicted/learned drive cycle. For example, for a predicted/learned drive cycle with one or more hill segments conducive to conducting a BP change evaporative emissions test, such a test may be scheduled for one or more of the hill segments. If such a predicted/learned drive cycle further includes one or more predicted stops conducive to conducting an EONV test, such a test may be scheduled for one or more of the stops. Similarly, if such a predicted/learned drive cycle further includes one or more predicted stops conducive to conducting an active draw evaporative emissions test, such a test may be scheduled for one or more of the stops. Accordingly, some driving routes may include any combination of an EONV test, an active draw evaporative emissions test, and/or a BP change evaporative emissions test. Alternatively, some driving routes may only include one test, for example an EONV test or active draw test at a final destination. Such an example may include a driving route without stops or hill segments conducive to conducting any evaporative emissions test. Still further, in some examples, while more than one stop or hill segment may be conducive to conducting an evaporative emissions test, an evaporative emissions test may only be scheduled for the stop or hill segment predicted to most likely result in a robust results.

Proceeding to 1435, method 1400 may include scheduling tests for undesired evaporative emissions based on the optimized test schedule generated at 1430. With the tests for undesired evaporative emissions scheduled, method 1400 may proceed to 1440 and may include conducting the appropriate test for undesired evaporative emissions at the appropriately scheduled time or location. For example, a BP change evaporative emissions test may be conducted as discussed above with regard to FIG. 6, an EONV test may be conducted as discussed above with regard to FIG. 9, and an active draw evaporative emissions test may be conducted as discussed above with regard to FIG. 12. Method 1400 may then end.

In this way, evaporative emissions test diagnostic procedures may be scheduled for hill segments and predicted/learned stops such that a vehicle fuel system and evaporative emissions system may be optimally tested for undesired evaporative emissions without the test(s) being prematurely terminated without completing. Furthermore, by conducting tests for undesired evaporative emissions during hill segments, where such tests may be conducted without engine operation, issues related to relying on heat rejection from the engine may be minimized. Still further, by conducting an active draw evaporative emissions test for stop durations predicted/learned to be less than a predetermined threshold duration (e.g. less than 45 minutes), the fuel system and evaporative emissions test may be conducted much more rapidly, thus potentially increasing completion rates associated with conducting tests for undesired evaporative emissions on the fuel system and evaporative emissions system.

The technical effect is to recognize that route learning may be utilized to predict/learn optimal opportunities for conducting evaporative emissions test diagnostics on a vehicle fuel system and evaporative emissions system. Based on the learned routes, tests for undesired evaporative emissions may be scheduled such that completion rates are increased, which may thus reduce undesired evaporative emissions.

The systems described herein, and with reference to FIGS. 1-2, along with the method described herein and with reference to FIG. 3, FIGS. 5-6, FIGS. 8-9, FIGS. 11-12, and FIG. 14, may enable one or more systems and one or more methods. In one example, a method may comprise learning routes commonly traveled by an engine driven vehicle, including altitude changes and stop durations; storing fuel vapors from a fuel system supplying fuel to the engine in a vapor storage device positioned in an evaporative emissions system; and diagnosing the fuel system and evaporative emissions system for undesired evaporative emissions based on a learned altitude change in a first condition, and based on a learned stop duration in a second condition. In a first example of the method, the method may further include wherein the learned altitude change in the first condition includes a change in altitude sufficient to result in a pressure change yield in the fuel system and evaporative emissions system greater than a predetermined pressure change yield threshold, under conditions where the fuel system and evaporative emissions system are sealed from atmosphere during the change in altitude. A second example of the method optionally includes the first example, and further comprises responsive to the predetermined pressure change yield threshold being reached during the change in altitude, sealing or maintaining sealed the fuel system and evaporative emissions system, monitoring pressure in the sealed fuel system and evaporative emissions system; and indicating the fuel system and evaporative emissions system are free from undesired evaporative emissions responsive to pressure in the fuel system and evaporative emissions system not reaching a predetermined pressure threshold for a predetermined duration. A third example of the method optionally includes any one or more or each of the first and second examples, and further includes wherein the predetermined pressure change yield threshold and predetermined pressure threshold are both positive with respect to atmospheric pressure responsive to the change in altitude comprising an increase in altitude, with the predetermined pressure change yield threshold more positive than the predetermined pressure threshold; and wherein the predetermined pressure change yield threshold and predetermined pressure threshold are both negative with respect to atmospheric pressure responsive to the change in altitude comprising a decrease in altitude, with the predetermined pressure change yield threshold more negative than the predetermined pressure threshold. A fourth example of the method optionally includes any one or more or each of the first through third examples and further comprises indicating whether the change in altitude is complete; and responsive to pressure in the sealed fuel system and evaporative emissions system reaching the predetermined pressure change yield threshold prior to the change in altitude being complete: maintaining pressure in the fuel system and evaporative emissions system at the predetermined pressure change yield threshold until the change in altitude is indicated to be complete. A fifth example of the method optionally includes any one or more or each of the first through fourth examples and further includes wherein diagnosing the fuel system and evaporative emissions system based on a learned stop duration in the second condition further comprises: responsive to a vehicle-off event corresponding to the learned stop duration comprising a duration less than a predetermined threshold duration, actively reducing pressure in the fuel system and evaporative emissions system to a predetermined target vacuum, and actively maintaining the predetermined target vacuum until a vehicle-off event is indicated. A sixth example of the method optionally includes any one or more or each of the first through fifth examples, and further includes wherein actively reducing pressure in the fuel system and evaporative emissions system further comprises: communicating vacuum from an engine intake manifold to the fuel system and evaporative emissions system, under conditions where the fuel system and evaporative emissions system are sealed from atmosphere. A seventh example of the method optionally includes any one or more or each of the first through sixth examples and further comprises responsive to the predetermined target vacuum being reached and the vehicle-off event being indicated, sealing or maintaining sealed the fuel system and evaporative emissions system from engine intake and from atmosphere; and indicating an absence of undesired evaporative emissions in the fuel system and evaporative emissions system responsive to pressure bleed-up in the fuel system and evaporative emissions system not reaching a predetermined pressure bleed-up threshold, or responsive to a pressure bleed-up rate not reaching or exceeding a predetermined pressure bleed-up rate threshold. An eighth example of the method optionally includes any one or more or each of the first through seventh examples and further includes wherein diagnosing the fuel system and evaporative emissions system based on a learned stop duration in the second condition further comprises: responsive to a vehicle-off event corresponding to the learned stop duration comprising a duration greater than the predetermined threshold duration, sealing the fuel system and evaporative emissions system, and indicating the absence of undesired evaporative emissions in the fuel system and evaporative emissions system responsive to a predetermined positive pressure threshold being reached; and under conditions where the positive pressure threshold is not indicated to be reached, relieving pressure in the fuel system and evaporative emissions system and then re-sealing the fuel system and evaporative emissions system, and indicating the absence of undesired evaporative emissions in the fuel system and evaporative emissions system responsive to a predetermined negative pressure threshold being reached.

An example of a system for a vehicle comprises a fuel tank positioned in a fuel system, configured to deliver fuel to an engine which drives the vehicle; an evaporative emissions control system including a fuel vapor storage device, the evaporative emissions system fluidically coupled to the fuel system, and selectively coupled to an intake manifold of the engine via a canister purge valve; a canister vent valve in a vent line stemming from the fuel vapor storage device, the canister vent valve configured to selectively couple the fuel system and evaporative emissions system to atmosphere; an onboard navigation system; a pressure sensor configured to monitor pressure in the fuel system and evaporative emissions system; and a controller storing instructions in non-transitory memory that, when executed, cause the controller to: learn common routes traveled by the vehicle in conjunction with the onboard navigation system, including learned altitude changes along the common routes predicted to result in a pressure change yield greater than a predetermined pressure change yield threshold in the fuel system and evaporative emissions system, when the fuel system and evaporative emissions system are sealed from atmosphere and from the intake manifold via the canister vent valve and canister purge valve being closed; learn stops and time durations associated with the learned stops for the learned common routes; and schedule tests to determine a presence or absence of undesired evaporative emissions in the fuel system and evaporative emissions system as a function of the learned altitude changes and learned stop durations for the learned common routes traveled by the vehicle. In a first example, the system further includes wherein the controller further stores instructions in non-transitory memory that, when executed, cause the controller to: responsive to an indication that the vehicle is commencing a learned altitude change predicted to result in pressure change yield greater than the predetermined pressure change yield threshold, and further responsive to the test for undesired evaporative emissions being scheduled for the learned altitude change: seal the fuel system and evaporative emissions system from atmosphere and from engine intake by commanding closed the canister vent valve and the canister purge valve. A second example of the system optionally includes the first example and further includes wherein the controller further stores instructions in non-transitory memory that, when executed, cause the controller to: monitor pressure in the fuel system and evaporative emissions system during the altitude change; and responsive to pressure in the fuel system and evaporative emissions system reaching the predetermined pressure change yield threshold, maintain pressure in the fuel system and evaporative emissions system at the predetermined pressure change yield threshold by duty cycling the canister vent valve until it is indicated that the altitude change is complete. A third example of the system optionally includes any one or more or each of the first through second examples and further includes wherein the controller further stores instructions in non-transitory memory that, when executed, cause the controller to: responsive to the predetermined pressure change yield threshold being reached and the altitude change being complete, seal or maintain sealed the fuel system and evaporative emissions system from atmosphere and engine intake; monitor pressure in the fuel system and evaporative emissions system; and indicate the presence of undesired evaporative emissions in the fuel system and evaporative emissions system responsive to pressure in the fuel system and evaporative emissions system reaching a predetermined pressure threshold prior to a predetermined time duration elapsing. A fourth example of the system optionally includes any one or more or each of the first through third examples and further includes wherein the controller further stores instructions in non-transitory memory that, when executed, cause the controller to: responsive to an indication that a learned stop duration is less than a predetermined threshold duration and further responsive to the test for undesired evaporative emissions being scheduled for the learned stop: actively reduce pressure in the fuel system and evaporative emissions system to a predetermined target vacuum level prior to stopping the vehicle at the learned stop by commanding closed the canister vent valve and duty cycling the canister purge valve to communicate intake manifold vacuum to the fuel system and evaporative emissions system. A fifth example of the system optionally includes any one or more or each of the first through fourth examples and further includes wherein the controller further stores instructions in non-transitory memory that, when executed, cause the controller to: responsive to the vehicle stopping at the learned stop, where the learned stop duration is less than the predetermined threshold duration and where pressure in the fuel system and evaporative emissions system is at the predetermined target vacuum level: command closed or maintain closed the canister purge valve and canister vent valve to seal the fuel system and evaporative emissions system from atmosphere and from engine intake; and indicate the presence of undesired evaporative emissions in the fuel system and evaporative emissions system responsive to pressure in the fuel system and evaporative emissions system reaching a predetermined pressure bleed-up threshold, or responsive to a pressure bleed-up rate reaching or exceeding a predetermined pressure bleed-up rate threshold. A sixth example of the system optionally includes any one or more or each of the first through fifth examples and further includes wherein the controller further stores instructions in non-transitory memory that, when executed, cause the controller to perform at least the steps below in response to an indication that a learned stop duration is greater than the predetermined threshold duration, and further in response to the test for undesired evaporative emissions being scheduled for the learned stop: seal the fuel system and evaporative emissions system by commanding or maintaining closed both the canister vent valve and canister purge valve, when the vehicle has stopped at the learned stop with the stop duration greater than the predetermined threshold duration; monitor pressure in the fuel system and evaporative emissions system subsequent to sealing the fuel system and evaporative emissions system; and indicate an absence of undesired evaporative emissions responsive to pressure in the fuel system and evaporative emissions system reaching a positive pressure threshold. A seventh example of the system optionally includes any one or more or each of the first through sixth examples and further includes wherein the controller further stores instructions in non-transitory memory that, when executed, cause the controller to: responsive to pressure in the fuel system and evaporative emissions system not reaching the predetermined positive pressure threshold, relieve pressure in the fuel system and evaporative emissions system via commanding open the canister vent valve; re-seal the fuel system and evaporative emissions system subsequent to relieving the pressure; and indicate the presence of undesired evaporative emissions in the fuel system and evaporative emissions system responsive to pressure in the fuel system and evaporative emissions system not reaching a predetermined negative pressure threshold within a predetermined duration.

Another example of a method comprises capturing and storing fuel vapors from a fuel system in a fuel vapor storage device positioned in an evaporative emissions system, the fuel system supplying fuel to an engine which propels a vehicle; learning a plurality of routes commonly traveled by the vehicle; learning stops along the plurality of routes where stop duration is greater than a predetermined stop duration; learning an amount of heat rejected by the engine at each of the stops where stop duration is greater than the predetermined stop duration; and in a first condition, including the learned amount of heat rejected by the engine below a heat rejection inference threshold for a particular stop, conducting a test for undesired evaporative emissions on the fuel system and evaporative emissions system by actively drawing a vacuum on the fuel system and evaporative emissions system; and in a second condition, including the learned amount of heat rejected by the engine greater than the heat rejection inference threshold for the particular stop, conducting a test for undesired evaporative emissions on the fuel system and evaporative emissions system without actively drawing vacuum on the fuel system and evaporative emissions system. In a first example of the method, the method further includes wherein actively drawing the vacuum on the fuel system and evaporative emissions system in the first condition includes sealing the fuel system and evaporative emissions system from atmosphere, and fluidically coupling the fuel system and evaporative emissions system to an intake manifold of the engine to reduce pressure in the fuel system and evaporative emissions system while the engine is in operation; and responsive to a predetermined target vacuum being reached and a vehicle-off event being indicated: sealing or maintaining sealed the fuel system and evaporative emissions system from engine intake and from atmosphere to trap the predetermined target vacuum in the fuel system and evaporative emissions system; and indicating an absence of undesired evaporative emissions in the fuel system and evaporative emissions system responsive to pressure bleed-up in the fuel system and evaporative emissions system not reaching a predetermined pressure bleed-up threshold, or responsive to a pressure bleed-up rate not reaching or exceeding a predetermined pressure bleed-up rate threshold. A second example of the method optionally includes the first example, and further includes wherein conducting the test for undesired evaporative emissions without actively drawing vacuum on the fuel system and evaporative emissions system in the second condition further comprises: sealing the fuel system and evaporative emissions system at a vehicle-off event, where the vehicle-off event corresponds to the particular stop, and indicating the absence of undesired evaporative emissions in the fuel system and evaporative emissions system responsive to a predetermined positive pressure threshold being reached; and under conditions where the positive pressure threshold is not indicated to be reached, relieving pressure in the fuel system and evaporative emissions system and then re-sealing the fuel system and evaporative emissions system, and indicating the absence of undesired evaporative emissions in the fuel system and evaporative emissions system responsive to a predetermined negative pressure threshold being reached.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
   a fuel tank positioned in a fuel system, configured to deliver fuel to an engine which drives the vehicle;
   an evaporative emissions control system including a fuel vapor storage device, the evaporative emissions system fluidically coupled to the fuel system, and selectively coupled to an intake manifold of the engine via a canister purge valve;
   a canister vent valve in a vent line stemming from the fuel vapor storage device, the canister vent valve configured to selectively couple the fuel system and evaporative emissions system to atmosphere;
   an onboard navigation system;
   a pressure sensor configured to monitor pressure in the fuel system and evaporative emissions system; and
   a controller storing instructions in non-transitory memory that, when executed, cause the controller to:
   learn common routes traveled by the vehicle in conjunction with the onboard navigation system, including learned altitude changes along the common routes predicted to result in a pressure change yield greater than a predetermined pressure change yield threshold in the fuel system and evaporative emissions system, when the fuel system and evaporative emissions system are sealed from atmosphere and from the intake manifold via the canister vent valve and canister purge valve being closed;
   learn stops and time durations associated with the learned stops for the learned common routes; and
   schedule tests to determine a presence or absence of undesired evaporative emissions in the fuel system and evaporative emissions system as a function of the learned altitude changes and learned stop durations for the learned common routes traveled by the vehicle.

2. The system of claim 1, wherein the controller further stores instructions in non-transitory memory that, when executed, cause the controller to:
   responsive to an indication that the vehicle is commencing a learned altitude change predicted to result in pressure change yield greater than the predetermined pressure change yield threshold, and further responsive to the test for undesired evaporative emissions being scheduled for the learned altitude change:
   seal the fuel system and evaporative emissions system from atmosphere and from engine intake by commanding closed the canister vent valve and the canister purge valve.

3. The system of claim 2, wherein the controller further stores instructions in non-transitory memory that, when executed, cause the controller to:
   monitor pressure in the fuel system and evaporative emissions system during the altitude change; and
   responsive to pressure in the fuel system and evaporative emissions system reaching the predetermined pressure change yield threshold, maintain pressure in the fuel system and evaporative emissions system at the predetermined pressure change yield threshold by duty cycling the canister vent valve until it is indicated that the altitude change is complete.

4. The system of claim 3, wherein the controller further stores instructions in non-transitory memory that, when executed, cause the controller to:

responsive to the predetermined pressure change yield threshold being reached and the altitude change being complete, seal or maintain sealed the fuel system and evaporative emissions system from atmosphere and engine intake;

monitor pressure in the fuel system and evaporative emissions system; and indicate the presence of undesired evaporative emissions in the fuel system and evaporative emissions system responsive to pressure in the fuel system and evaporative emissions system reaching a predetermined pressure threshold prior to a predetermined time duration elapsing.

5. The system of claim 1, wherein the controller further stores instructions in non-transitory memory that, when executed, cause the controller to:

responsive to an indication that a learned stop duration is less than a predetermined threshold duration and further responsive to the test for undesired evaporative emissions being scheduled for the learned stop:

actively reduce pressure in the fuel system and evaporative emissions system to a predetermined target vacuum level prior to stopping the vehicle at the learned stop by commanding closed the canister vent valve and duty cycling the canister purge valve to communicate intake manifold vacuum to the fuel system and evaporative emissions system.

6. The system of claim 5, wherein the controller further stores instructions in non-transitory memory that, when executed, cause the controller to:

responsive to the vehicle stopping at the learned stop, where the learned stop duration is less than the predetermined threshold duration and where pressure in the fuel system and evaporative emissions system is at the predetermined target vacuum level:

command closed or maintain closed the canister purge valve and canister vent valve to seal the fuel system and evaporative emissions system from atmosphere and from engine intake; and indicate the presence of undesired evaporative emissions in the fuel system and evaporative emissions system responsive to pressure in the fuel system and evaporative emissions system reaching a predetermined pressure bleed-up threshold, or responsive to a pressure bleed-up rate reaching or exceeding a predetermined pressure bleed-up rate threshold.

7. The system of claim 5, wherein the controller further stores instructions in non-transitory memory that, when executed, cause the controller to perform at least the steps below in response to an indication that a learned stop duration is greater than the predetermined threshold duration, and further in response to the test for undesired evaporative emissions being scheduled for the learned stop:

seal the fuel system and evaporative emissions system by commanding or maintaining closed both the canister vent valve and canister purge valve, when the vehicle has stopped at the learned stop with the stop duration greater than the predetermined threshold duration;

monitor pressure in the fuel system and evaporative emissions system subsequent to sealing the fuel system and evaporative emissions system; and indicate an absence of undesired evaporative emissions responsive to pressure in the fuel system and evaporative emissions system reaching a positive pressure threshold.

8. The system of claim 7, wherein the controller further stores instructions in non-transitory memory that, when executed, cause the controller to:

responsive to pressure in the fuel system and evaporative emissions system not reaching the predetermined positive pressure threshold, relieve pressure in the fuel system and evaporative emissions system via commanding open the canister vent valve;

re-seal the fuel system and evaporative emissions system subsequent to relieving the pressure; and indicate the presence of undesired evaporative emissions in the fuel system and evaporative emissions system responsive to pressure in the fuel system and evaporative emissions system not reaching a predetermined negative pressure threshold within a predetermined duration.

9. A method comprising:

learning routes commonly traveled by an engine driven vehicle, including altitude changes and stop durations;

storing fuel vapors from a fuel system supplying fuel to the engine in a vapor storage device positioned in an evaporative emissions system; and diagnosing the fuel system and evaporative emissions system for undesired evaporative emissions based on a learned altitude change in a first condition, and based on a learned stop duration in a second condition.

10. The method of claim 9, wherein the learned altitude change in the first condition includes a change in altitude sufficient to result in a pressure change yield in the fuel system and evaporative emissions system greater than a predetermined pressure change yield threshold, under conditions where the fuel system and evaporative emissions system are sealed from atmosphere during the change in altitude.

11. The method of claim 10, further comprising:

responsive to the predetermined pressure change yield threshold being reached during the change in altitude, sealing or maintaining sealed the fuel system and evaporative emissions system, monitoring pressure in the sealed fuel system and evaporative emissions system; and indicating the fuel system and evaporative emissions system are free from undesired evaporative emissions responsive to pressure in the fuel system and evaporative emissions system not reaching a predetermined pressure threshold for a predetermined duration.

12. The method of claim 11, wherein the predetermined pressure change yield threshold and predetermined pressure threshold are both positive with respect to atmospheric pressure responsive to the change in altitude comprising an increase in altitude, with the predetermined pressure change yield threshold more positive than the predetermined pressure threshold; and wherein the predetermined pressure change yield threshold and predetermined pressure threshold are both negative with respect to atmospheric pressure responsive to the change in altitude comprising a decrease in altitude, with the predetermined pressure change yield threshold more negative than the predetermined pressure threshold.

13. The method of claim 10, further comprising:

indicating whether the change in altitude is complete; and responsive to pressure in the sealed fuel system and evaporative emissions system reaching the predetermined pressure change yield threshold prior to the change in altitude being complete:

maintaining pressure in the fuel system and evaporative emissions system at the predetermined pressure change yield threshold until the change in altitude is indicated to be complete.

14. The method of claim 9, wherein diagnosing the fuel system and evaporative emissions system based on a learned stop duration in the second condition further comprises:
responsive to a vehicle-off event corresponding to the learned stop duration comprising a duration less than a predetermined threshold duration, actively reducing pressure in the fuel system and evaporative emissions system to a predetermined target vacuum, and actively maintaining the predetermined target vacuum until a vehicle-off event is indicated.

15. The method of claim 14, wherein actively reducing pressure in the fuel system and evaporative emissions system further comprises:
communicating vacuum from an engine intake manifold to the fuel system and evaporative emissions system, under conditions where the fuel system and evaporative emissions system are sealed from atmosphere.

16. The method of claim 14, further comprising:
responsive to the predetermined target vacuum being reached and the vehicle-off event being indicated, sealing or maintaining sealed the fuel system and evaporative emissions system from engine intake and from atmosphere; and
indicating an absence of undesired evaporative emissions in the fuel system and evaporative emissions system responsive to pressure bleed-up in the fuel system and evaporative emissions system not reaching a predetermined pressure bleed-up threshold, or responsive to a pressure bleed-up rate not reaching or exceeding a predetermined pressure bleed-up rate threshold.

17. The method of claim 14, wherein diagnosing the fuel system and evaporative emissions system based on a learned stop duration in the second condition further comprises:
responsive to a vehicle-off event corresponding to the learned stop duration comprising a duration greater than the predetermined threshold duration, sealing the fuel system and evaporative emissions system, and indicating the absence of undesired evaporative emissions in the fuel system and evaporative emissions system responsive to a predetermined positive pressure threshold being reached; and
under conditions where the positive pressure threshold is not indicated to be reached, relieving pressure in the fuel system and evaporative emissions system and then re-sealing the fuel system and evaporative emissions system, and indicating the absence of undesired evaporative emissions in the fuel system and evaporative emissions system responsive to a predetermined negative pressure threshold being reached.

18. A method comprising:
capturing and storing fuel vapors from a fuel system in a fuel vapor storage device positioned in an evaporative emissions system, the fuel system supplying fuel to an engine which propels a vehicle;
learning a plurality of routes commonly traveled by the vehicle;
learning stops along the plurality of routes where stop duration is greater than a predetermined stop duration;
learning an amount of heat rejected by the engine at each of the stops where stop duration is greater than the predetermined stop duration; and
in a first condition, including the learned amount of heat rejected by the engine below a heat rejection inference threshold for a particular stop, conducting a test for undesired evaporative emissions on the fuel system and evaporative emissions system by actively drawing a vacuum on the fuel system and evaporative emissions system; and
in a second condition, including the learned amount of heat rejected by the engine greater than the heat rejection inference threshold for the particular stop, conducting a test for undesired evaporative emissions on the fuel system and evaporative emissions system without actively drawing vacuum on the fuel system and evaporative emissions system.

19. The method of claim 18, wherein actively drawing the vacuum on the fuel system and evaporative emissions system in the first condition includes sealing the fuel system and evaporative emissions system from atmosphere, and fluidically coupling the fuel system and evaporative emissions system to an intake manifold of the engine to reduce pressure in the fuel system and evaporative emissions system while the engine is in operation; and
responsive to a predetermined target vacuum being reached and a vehicle-off event being indicated:
sealing or maintaining sealed the fuel system and evaporative emissions system from engine intake and from atmosphere to trap the predetermined target vacuum in the fuel system and evaporative emissions system; and
indicating an absence of undesired evaporative emissions in the fuel system and evaporative emissions system responsive to pressure bleed-up in the fuel system and evaporative emissions system not reaching a predetermined pressure bleed-up threshold, or responsive to a pressure bleed-up rate not reaching or exceeding a predetermined pressure bleed-up rate threshold.

20. The method of claim 18, wherein conducting the test for undesired evaporative emissions without actively drawing vacuum on the fuel system and evaporative emissions system in the second condition further comprises:
sealing the fuel system and evaporative emissions system at a vehicle-off event, where the vehicle-off event corresponds to the particular stop, and indicating the absence of undesired evaporative emissions in the fuel system and evaporative emissions system responsive to a predetermined positive pressure threshold being reached; and
under conditions where the positive pressure threshold is not indicated to be reached, relieving pressure in the fuel system and evaporative emissions system and then re-sealing the fuel system and evaporative emissions system, and indicating the absence of undesired evaporative emissions in the fuel system and evaporative emissions system responsive to a predetermined negative pressure threshold being reached.

* * * * *